(12) United States Patent
Chistyakov et al.

(10) Patent No.: US 11,036,858 B2
(45) Date of Patent: Jun. 15, 2021

(54) SYSTEM AND METHOD FOR TRAINING A MODEL FOR DETECTING MALICIOUS OBJECTS ON A COMPUTER SYSTEM

(71) Applicant: AO Kaspersky Lab, Moscow (RU)

(72) Inventors: Alexander S. Chistyakov, Moscow (RU); Alexey M. Romanenko, Moscow (RU); Alexander S. Shevelev, Moscow (RU)

(73) Assignee: AO Kaspersky Lab, Moscow (RU)

( * ) Notice: Subject to any disclaimer, the term of this patent is extended or adjusted under 35 U.S.C. 154(b) by 43 days.

(21) Appl. No.: 16/459,718

(22) Filed: Jul. 2, 2019

(65) Prior Publication Data
US 2020/0210573 A1 Jul. 2, 2020

Related U.S. Application Data

(63) Continuation of application No. 16/452,734, filed on Jun. 26, 2019.

(30) Foreign Application Priority Data

Dec. 28, 2018 (RU) ............................ RU2018147230

(51) Int. Cl.
*G06F 21/56* (2013.01)
*G06N 5/02* (2006.01)
(Continued)

(52) U.S. Cl.
CPC ............ *G06F 21/566* (2013.01); *G06F 21/56* (2013.01); *G06F 21/561* (2013.01);
(Continued)

(58) Field of Classification Search
CPC ...... G06F 21/56; G06F 21/566; G06F 21/564; G06F 21/561; G06F 21/562;
(Continued)

(56) References Cited

U.S. PATENT DOCUMENTS 9,288,220 B2   3/2016  Raugas et al.
9,690,933 B1*  6/2017  Singh .................... G06N 5/045
(Continued)

FOREIGN PATENT DOCUMENTS

EP    3252645 A1   12/2017
RU    2654151 C1    5/2018

OTHER PUBLICATIONS

Uwagbole, Solomon Ogbomon; Buchanan, William J.; Fan, Lu; "Applied Machine Learning Predictive Analytics to SQL Injection Attack Detection and Prevention", IFIP/IEEE Symposium on Integrated Network and Service Management (IM), IEEE, May 8-12, 2017, pp. 1087-1090.*

(Continued)

*Primary Examiner* — Victor Lesniewski
(74) *Attorney, Agent, or Firm* — Arent Fox LLP; Michael Fainberg

(57) ABSTRACT

Methods and systems are described in the present disclosure for training a model for detecting malicious objects on a computer system. In an exemplary aspect, a method includes: selecting files from a database used for training a detection model, the selection is performed based on learning rules, performing an analysis on the files by classifying them in a hierarchy of maliciousness, forming behavior patterns based on execution of the files and parameters of the execution, training the detection model according to the analysis of the files and the behavior patterns, verifying the trained detection model using a test selection of files to test determinations of harmfulness of the test selection of files, and when the verification fails, retraining the detection model using a different set of files from the database, otherwise applying the detection model to a new set of files to determine maliciousness.

20 Claims, 12 Drawing Sheets

(51) Int. Cl.
  *G06N 20/10* (2019.01)
  *G06K 9/62* (2006.01)
(52) U.S. Cl.
  CPC .......... *G06F 21/562* (2013.01); *G06F 21/564* (2013.01); *G06K 9/6257* (2013.01); *G06K 9/6276* (2013.01); *G06N 5/025* (2013.01); *G06N 20/10* (2019.01)
(58) Field of Classification Search
  CPC .... G06F 21/552; G06N 20/10; G06N 3/0454; G06N 5/003; G06N 20/00; G06N 5/025; G06N 20/20; G06K 9/6273; G06K 9/6277; G06K 9/62; G06K 9/6218; G06K 9/6257; G06K 9/6276; G06K 9/627
  See application file for complete search history.

(56) References Cited

U.S. PATENT DOCUMENTS

| | | | | |
|---|---|---|---|---|
| 10,318,735 | B2* | 6/2019 | Saxe | H04L 63/1416 |
| 10,652,252 | B2* | 5/2020 | Luan | G06F 21/566 |
| 10,726,128 | B2* | 7/2020 | Krasser | G06N 7/005 |
| 2013/0326625 | A1* | 12/2013 | Anderson | G06F 21/566 |
| | | | | 726/23 |
| 2015/0096024 | A1* | 4/2015 | Haq | G06F 21/552 |
| | | | | 726/23 |
| 2016/0191550 | A1* | 6/2016 | Ismael | H04L 63/1416 |
| | | | | 726/1 |
| 2016/0277423 | A1* | 9/2016 | Apostolescu | G06F 21/566 |
| 2016/0337390 | A1 | 11/2016 | Sridhara | |
| 2017/0024663 | A1* | 1/2017 | Liu | G06N 7/005 |
| 2017/0083703 | A1* | 3/2017 | Abbasi | G06F 21/561 |
| 2017/0262633 | A1* | 9/2017 | Miserendino | G06F 21/564 |
| 2018/0004948 | A1* | 1/2018 | Martin | G06F 21/566 |
| 2018/0048660 | A1* | 2/2018 | Paithane | G06F 21/554 |
| 2018/0052997 | A1* | 2/2018 | Wray | G06F 21/562 |
| 2018/0060580 | A1* | 3/2018 | Zhao | G06F 21/50 |
| 2018/0082201 | A1* | 3/2018 | Cantwell | G06N 7/005 |
| 2018/0198800 | A1* | 7/2018 | Krasser | G06F 21/56 |
| 2018/0253551 | A1* | 9/2018 | Chalmandrier-Perna | |
| | | | | G06F 9/45558 |
| 2018/0322287 | A1* | 11/2018 | Zhao | G06N 3/08 |
| 2019/0042745 | A1* | 2/2019 | Chen | G06K 9/4628 |
| 2019/0132334 | A1* | 5/2019 | Johns | G06N 3/04 |
| 2019/0156024 | A1* | 5/2019 | Kim | G06F 21/52 |
| 2019/0228154 | A1* | 7/2019 | Agrawal | G06N 3/08 |
| 2019/0332769 | A1* | 10/2019 | Fralick | H04L 63/145 |
| 2020/0050761 | A1* | 2/2020 | Lancioni | G06F 21/554 |
| 2020/0159916 | A1* | 5/2020 | Nguyen | G06F 11/3006 |

OTHER PUBLICATIONS

Ali, Siti Hajar Aminah; Ozawa, Seiichi; Ban, Tao; Nakazato, Junji; Shimamura, Jumpei; "A Neural Network Model for Detecting DDoS Attacks Using Darknet Traffic Features", International Joint Conference on Neural Networks (IJCNN), IEEE, Jul. 24-29, 2016, pp. 2979-2985.*

* cited by examiner

SYSTEM AND METHOD FOR TRAINING A MODEL FOR DETECTING MALICIOUS OBJECTS ON A COMPUTER SYSTEM

CROSS-REFERENCE TO RELATED APPLICATIONS

This application is a continuation of U.S. patent application Ser. No. 16/452,734 filed on Jun. 26, 2019, which claims benefit of priority under 35 U.S.C. 119(a)-(d) to Russian Patent Application No. 2018147230 filed Dec. 28, 2018, both of which are incorporated by reference herein.

FIELD OF TECHNOLOGY

The present disclosure relates to data analysis technologies, specifically to systems and methods for training a model for detecting malicious objects on a computer system.

BACKGROUND

The rapid growth of computer technologies in the past decade, and also the widespread use of different types of computing devices (personal computers, notebooks, tablets, smartphones, and so on), has strongly influenced the use of those devices in diverse areas of activity for a large number of tasks (from Internet surfing to bank transfers and electronic document traffic). In parallel with the growth in the number of computing devices and the software running on these devices, the number of malicious programs has also grown at a rapid pace.

A large variety of malicious programs exist at present, some that steal personal and confidential data from the devices of users (such as logins and passwords, bank details, electronic documents). Other malicious programs form "botnets" from the devices of users for attacks such as a DDoS (Distributed Denial of Service) or for sorting through passwords using brute force against other computers or computer networks. Still other malicious programs propose paid content to users through intrusive advertising, paid subscriptions, sending of SMS to toll numbers, and so forth.

Specialized programs known as antivirus programs are used to deal with malicious programs, including detection of the malicious programs, prevention of infection, and restoration of the working capacity of the computing devices infected with malicious programs. Antivirus programs employ various technologies to detect the full variety of malicious programs, such as:
  a) static analysis—analysis of programs for harmfulness, including running or emulating the programs being analyzed, based on data contained in files constituting the programs being analyzed, whereby it is possible to use during statistical analysis:
  b) signature analysis—searching for correspondences of a particular segment of code of the programs being analyzed to known code signatures from a database of signatures of malicious programs;
  c) white and black lists—a search for calculated check sums of the programs being analyzed (or portions thereof) in a database of check sums of malicious programs (black lists) or a database of check sums of safe programs (white lists);
  d) dynamic analysis—analysis of programs for harmfulness based on data obtained in the course of execution or emulation of the programs being analyzed, whereby it is possible to use during dynamic analysis:
  e) heuristic analysis—emulation of the programs being analyzed, the creating of emulation logs (containing data on the calls of API functions, the parameters transmitted, the code segments of the programs being analyzed, and so on) and the search for correspondences between the data of the logs created and the data from a database of behavioral signatures of malicious programs;
  f) proactive protection—intercepting the calls of API functions of the launched programs being analyzed, creating logs of the behavior of the programs being analyzed (containing data on the calls of API functions, the parameters transmitted, the code segments of the programs being analyzed, and so on) and searching for correspondences between the data of the logs created and the data from a database of calls of malicious programs.

Both static and dynamic analysis have their advantages and disadvantages. Static analysis is less demanding of resources of the computing device on which the analysis is being performed. Further, since static analysis does not require the execution or the emulation of the program being analyzed, static analysis is faster, but at the same time less effective than dynamic analysis. In other words, static analysis often has a lower percentage of detection of malicious programs and a higher percentage of false alarms (i.e., pronouncing a verdict that a file analyzed by the means of the antivirus program is malicious, even though it is safe) than dynamic analysis. Dynamic analysis is slower because it uses data obtained during the execution or emulation of the program being analyzed, and dynamic analysis places higher demands on the resources of the computing device on which the analysis is being performed, but it is also more effective. Modern antivirus programs employ a comprehensive analysis, including elements of both static and dynamic analysis.

Since modern standards of computer security require an operative response to malicious programs (especially to new malicious programs), automatic detection of malicious programs are the primary focus of attention. For the effective operation of automatic detection, elements of artificial intelligence and various methods of machine learning of models are often used for the detection of malicious programs (i.e., sets of rules for decision making as to the harmfulness of a file on the basis of a certain set of input data describing the malicious file). This enables an effective detection of not only well-known malicious programs or malicious programs with well-known malicious behavior, but also new malicious programs having unknown or little studied malicious behavior, as well as an operative adaptation (learning) to detect new malicious programs The present disclosure makes it possible to solve the problem of detecting of malicious files.

SUMMARY

The disclosure is directed towards the classification of objects of a computer system in order to determine whether the objects are malicious.

One technical result of the present disclosure includes increasing the accuracy of classification of objects of a computer system by the use of two stages of evaluation of the classes to which the objects of the computer system belong.

An exemplary method for detecting malicious objects on a computer system, comprises collecting data describing a state of an object of the computer system, forming a vector of features characterizing the state of the object, calculating a degree of similarity based on the formed vector of features, wherein the degree of similarity is a numerical value characterizing the probability that the object being classified may belong to a given class, calculating a limit degree of difference that is a numerical value characterizing the probability that the object being classified will certainly belong to another class, forming a criterion for determination of class of the object based on the degree of similarity and the limit degree of difference, determining that the object belongs to the determined class when the data satisfies the criterion, wherein the data is collected over a period of time defined by a data collection rule and pronouncing the object as malicious when it is determined that the object belongs to the specified class.

In one aspect, the criterion is a rule for the classification of the object by an established correlation between the degree of similarity and the limit degree of difference.

In one aspect, the correlation between the degree of similarity and the limit degree of difference is one or more of: a difference in distance between the degree of similarity and the limit degree of difference from a predetermined threshold value; a difference in the area bounded in a given time interval between the degree of similarity and the limit degree of difference from a predetermined threshold value; and a difference in the rate of mutual growth of the curve describing the change in the degree of harmfulness and the limit degree of difference from a predetermined value.

In one aspect, the vector of features is a convolution of collected data organized in the form of a set of numbers.

In one aspect, the data collection rule is one of: an interval of time between different states of the object satisfies a predetermined value, and a change in a parameter of the computer system resulting in a change in state of the object satisfies a given value.

In one aspect, the limit degree of difference being calculated depends on the degree of similarity and wherein the limit degree of difference is calculated one of: at the instant of creating the object, at the instant of a first change in state of the object, and based on analysis of static parameters of the object.

In one aspect, if in the course of the period defined by the data collection rule at least two degrees of similarity and limit degrees of difference have been calculated, a set of consecutively calculated degrees of similarity and limit degrees of difference is described by a predetermined time law.

In one aspect, the time laws describing the consecutively calculated degrees of similarity and the consecutively calculated limit degrees of difference are monotonic.

An exemplary system described herein comprises a hardware processor configured to: collect data describing a state of an object of the computer system, form a vector of features characterizing the state of the object, calculate a degree of similarity based on the formed vector of features, wherein the degree of similarity is a numerical value characterizing the probability that the object being classified may belong to a given class, calculate a limit degree of difference that is a numerical value characterizing the probability that the object being classified will certainly belong to another class, form a criterion for determination of class of the object based on the degree of similarity and the limit degree of difference, determine that the object belongs to the determined class when the data satisfies the criterion, wherein the data is collected over a period of time defined by a data collection rule and pronounce the object as malicious when it is determined that the object belongs to the specified class.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplary pointed out in the claims.

DETAILED DESCRIPTION

The disclosed system and method are directed to classifying objects on a computer system as malicious or safe, in accordance with exemplary aspects of the present disclosure. Example aspects are described herein in the context of a system, method and computer program product for classifying objects on a computer system as malicious or safe. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

The following definitions are used throughout the disclosure to describe the various aspects. aspect Malicious file—a file whose execution is known to result in unauthorized destruction, blocking, modification or copying of computer information or neutralization of computer information protection systems.

Malicious behavior of an executable file—a group of actions that may be performed during execution of that file and that are known to be able to result in unauthorized destruction, blocking, modification or copying of computer information or neutralization of computer information protection systems.

Malicious activity of an executable file—a group of actions performed by that file in accordance with its malicious behavior.

Computing device of the average user—a hypothetical (theoretical) computing device, having average characteristics of the computing devices of a previously selected group of users, on which the same applications are executed as on the computing devices of those users.

Command executable by a computing device—a set of machine instructions or instructions of scripts executable by a computing device on the basis of the parameters of those instructions, known as command parameters or parameters describing said command.

Lexical analysis (tokenizing)—a process of analytical parsing of an input sequence of characters into recognized groups (hereafter: lexemes), in order to form identification sequences at the output (hereafter: tokens).

Token—an identification sequence formed from a lexeme in the process of lexical analysis.

Figure 1:
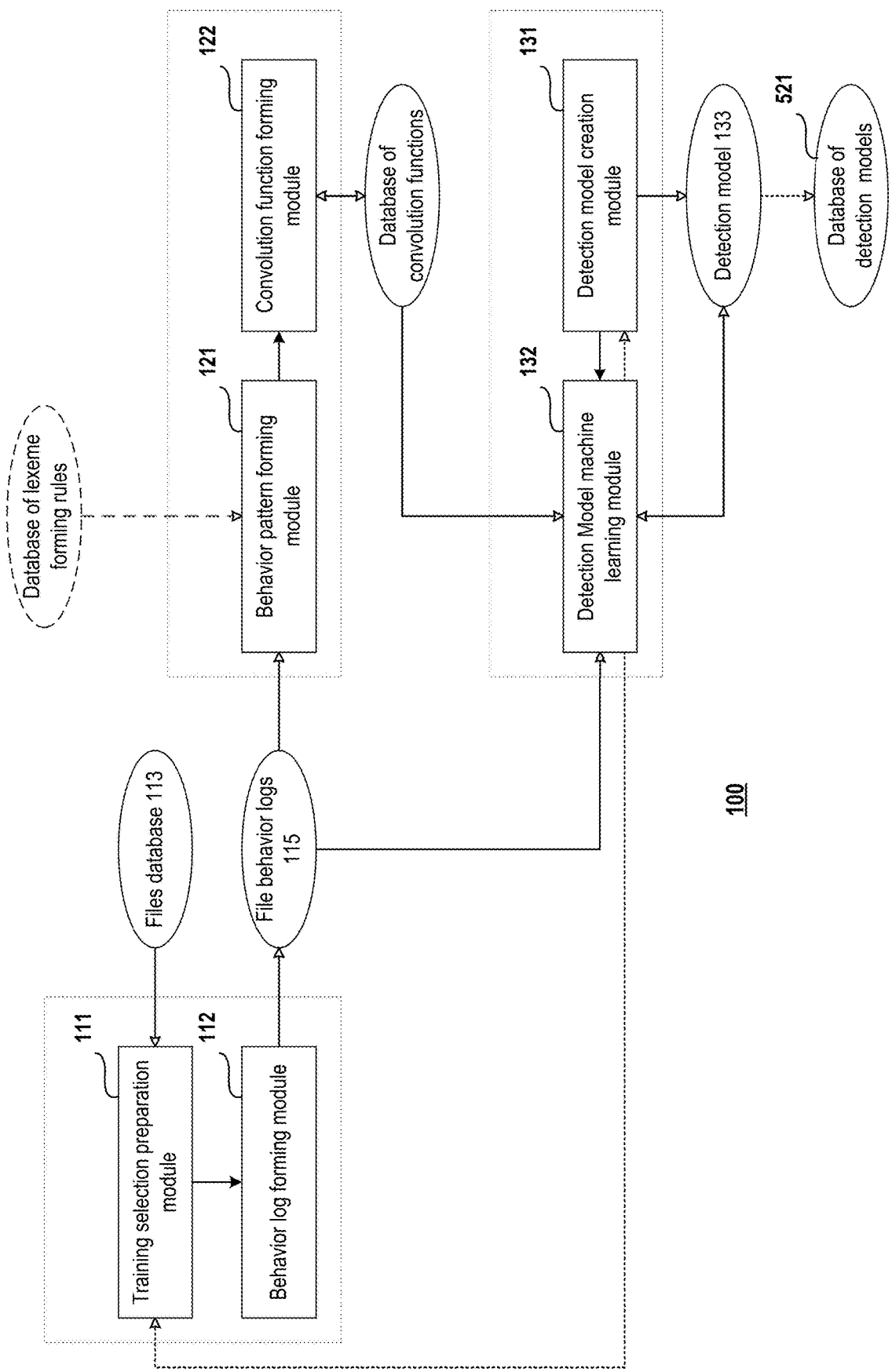
FIG. 1 is a structural diagram of a system 100 for machine learning of a model for detection of malicious files, in accordance with exemplary aspects of the present disclosure.

FIG. 1 is a structural diagram of a system 100 for machine learning of a model for detection of malicious files, in accordance with exemplary aspects of the present disclosure.

The structural diagram of the system 100 for machine learning consists of a training selection preparation module 111, a behavior log forming module 112, a behavior pattern forming module 121, a convolution function forming module 122, a detection model creating module 131, and a detection model machine learning module 132.

In one variant aspect, the system 100 has a client-server architecture, in which the training selection preparation module 111, the behavior log forming module 112, the behavior pattern forming module 121, the convolution function forming module 122, the detection model creating module 131, and the detection model machine learning module 132 work at the server side, and the behavior pattern forming module 121.

For example, the client may be the computing devices of a user, such as a personal computer, a notebook, a smartphone, and so forth. The server may be the computing devices of an antivirus company, such as distributed systems of servers that perform at least a preliminary collection and antivirus analysis of files, a creation of antivirus records, and so forth. The system 100 is used in some aspects to detect malicious files at the client side, thereby enhancing the effectiveness of the antivirus protection of that client.

In yet another example, both the client and the server may be the computing devices of the antivirus company alone, wherein the system 100 may be used for automated antivirus analysis of files and creation of antivirus records, thereby enhancing the working effectiveness of the antivirus company.

In exemplary aspects, the training selection preparation module 111 is configured to:
select at least one file from a database of files 113 in accordance with predetermined learning rules of forming a learning selection of files, after which the detection model machine learning module 132 will carry out the teaching of the model of detection on the basis of an analysis of the selected files;
send the selected files to the behavior log forming module 112.

In one variant aspect of the system 100, at least one safe file and one malicious file are kept in the database of files 113.

For example, the database of files 113 may keep, as safe files, the files of the operating system Windows, and as malicious files the files of backdoors, applications carrying out unauthorized access to data and remote control of an operating system and a computer as a whole. By training with the mentioned files and using methods of machine learning, the model for detection of malicious files will be able to detect malicious files having a functionality similar to the functionality of the aforementioned backdoors with high accuracy (the higher the accuracy the more files are used for the teaching of the aforementioned model of detection).

In yet another variant aspect of the system, the database of files 113 additionally keeps at least:
suspicious files (riskware)—files which are not malicious, yet are able to carry out malicious actions;
unknown files—files whose harmfulness has not been determined and remains unknown (i.e., files which are not safe, malicious, suspicious, and so forth).

For example, the database of files 113 may have, as suspicious files, the files of applications for remote administration (such as RAdmin), archiving, or data encryption (such as WinZip), and so on.

In yet another variant aspect of the system, the database of files 113 keeps at least files:
collected by antivirus web crawlers;
sent in by users.
The mentioned files are analyzed by antivirus experts, including with the help of automatic means of file analysis, in order to then pronounce a verdict as to the harmfulness of such files.

For example, the database of files 113 may store files that were sent in by users from their computing devices to the antivirus companies for checking their harmfulness. The files transmitted may be either safe or malicious, and the distribution between the number of said safe and malicious files is close to the distribution between the number of all safe and malicious files located on the computing devices of said users (i.e., the ratio of the number of said safe files to the number of said malicious files differs from the ratio of the number of all safe files to the number of all malicious files located on the computing devices of said users by a quantity less than a specified threshold value:

$$\left| \frac{N_{clean}}{N_{malware}} - \frac{\forall N_{clean}}{\forall N_{malware}} \right| < \varepsilon \right).$$

Unlike the files sent in by the users (i.e., files which are subjectively suspicious), the files collected by antivirus web crawlers that are designed to search for suspicious and malicious files more often prove to be malicious.

In yet another variant aspect of the system 100, at least one of the following conditions is used as the criteria for selecting files from the database of files 113:
  the distribution between safe and malicious files selected from the database of files 113 corresponds to the distribution between safe and malicious files located on the computing device of the average user;
  the distribution between safe and malicious files selected from the database of files 113 corresponds to the distribution between safe and malicious files collected with the help of antivirus web crawlers;
  the parameters of the files selected from the database of files 113 correspond to the parameters of the files located on the computing device of the average user;
  the number of selected files corresponds to a predetermined value, while the files themselves are selected at random.

For example, the database of files 113 contains 100,000 files, among which 40% are safe files and 60% are malicious files. 150,000 files (15% of the total number of files being kept in the database of files 113) are selected from the database of files 113 such that the distribution between the selected safe and malicious files corresponds to the distribution between the safe and the malicious files located on the computing device of the average user, amounting to 95 safe files for every 5 malicious files. For this purpose, 14,250 safe files (35.63% of the total number of safe files) and 750 malicious files (1.25% of the total number of malicious files) are chosen at random from the database of files 113.

In yet another example, the database of files 113 contains 1,250,000 files, of which 95% are safe files and 5% are malicious files. Thus, the distribution between safe and malicious files being kept in the database of files 113 corresponds to the distribution between the safe and the malicious files located on the computing device of the average user. Of these files, 5,000 files are chosen at random, approximately 4,750 of which prove to be safe files and approximately 250 prove to be malicious files, with a high probability.

In yet another variant aspect of the system, the file parameters are at least:
  the harmfulness of the file, characterizing whether the file is safe, malicious, potentially dangerous, or the behavior of the computer system when executing the file is not determined, and so forth;
  the number of commands performed by the computing device during the execution of the file;
  the size of the file;
  the applications utilizing the file.

For example, files that contain scripts in the "ActionScript" language, executable by the application "Adobe Flash", and not exceeding 5 kB in size, are chosen from the database of files 113 as malicious.

In yet another variant aspect of the system, the training selection preparation module 111 is additionally designed to:
  select at least one other file from the database of files 113 in accordance with predetermined rules of forming a test selection of files, after which the detection model machine learning module 132 will carry out a verification of the trained model of detection on the basis of an analysis of the selected files;
  send the selected files to the behavior log forming module 112.

In another example, the database of files 113 may contain 75,000 files, 20% of which are safe files and 80% of which are malicious files. initially, 12,500 files are chosen from the database of files 113, 30% of which are safe files and 70% of which are malicious files. Subsequently, the detection model machine learning module 132 teaches the detection model 133 on the basis of an analysis of the selected files. After this step, 2,500 files are selected from the remaining 62500 files, of which 60% are safe files and 40% are malicious files. and after this the detection model machine learning module 132 will check the trained detection model 133 based on analysis of the selected files. The data formulated in the above described manner is referred to as a cross-validation set of data.

In one aspect, the behavior log forming module 112 is configured to:
  intercept at least one executable command at least during:
    the execution of the file received,
    the emulation of the execution of the file received, wherein the emulation of the execution of the file includes the opening of the mentioned file (for example, the opening of a script by an interpreter);
  determine for each intercepted command at least one parameter describing that command;
  form a behavior log 115 of the obtained file on the basis of the intercepted commands and the parameters so determined, wherein the behavior log constitutes the totality of intercepted commands (hereinafter, the command) from the file, where each command corresponds at least to one parameter so determined and describing that command (hereinafter, the parameter).

For example, the following is an example of commands intercepted during the execution of a malicious file that collects passwords and transmits them via a computer network, and the parameters calculated for said commands:
  CreateFile, 'c\windows\system32\data.pass'
  ReadFile, 0x14ea25f7, 0xf000
  connect, http://stealpass.com
  send, 0x14ea25f7, 0xf000
  In one variant aspect of the system 100, the intercepting of commands from the file is done with the aid of at least:
  a specialized driver;
  a debugger;
  a hypervisor.

For example, the intercepting of commands during the execution of the file and the determination of their parameters is performed using a driver that utilizes an interception by splicing of the entry point of a WinAPI function.

In yet another example, intercepting commands during emulation of the execution of a file is performed directly by emulation software or hardware that determines the parameters of the command to be emulated.

In yet another example, intercepting commands during execution of the file on a virtual machine is performed by means of a hypervisor that determines the parameters of the command to be emulated.

In yet another variant aspect of the system, the intercepted commands from the file include at least:
  API functions;
  sets of machine instructions describing a predetermined set of actions (macro commands).

For example, malicious programs very often perform a search for certain files and modify their attributes, for which they employ a sequence of commands such as:
  FindFirstFile, 'c\windows\system32\*.pass', 0x40afb86a
  SetFileAttributes, 'c\windows\system32\data.pass'

FindNextFile, 0x40afb86a

CloseHandle, 0x40afb86a which may in turn be described by only a single command

_change_attributes, 'c\windows\system32\*.pass'

In yet another variant aspect of the system, each command is matched up with a unique identifier.

For example, all WinAPI functions may be matched up with numbers in the range of 0x0000 to 0x8000, where each WinAPI function corresponds to a unique number (for example, ReadFile→0x00f0, ReadFileEx→0x00f1, connect→0x03A2).

In yet another variant aspect of the system, several commands describing similar actions are matched up with a single identifier.

For example, all commands such as ReadFile, ReadFileEx, ifstream, getline, getchar and so forth, which describe a reading of data from a file, are matched up with an identifier_read_data_file (0x70F0).

In one aspect, the behavior pattern forming module 121 is configured to:

form at least one behavior pattern on the basis of the commands and parameters selected from the behavior log, wherein the behavior log constitutes the totality of executable commands (hereinafter, the command) from the file, where each command corresponds at least to one parameter describing that command (hereinafter, the parameter), the behavior pattern being a set of at least one command and such a parameter, which describes all of the commands of that set (hereinafter, the elements of the behavior pattern);

send the behavior patterns so formed to the convolution function forming module 122;

For example, from the behavior log the following commands $c_i$ and parameters $p_i$ are selected:

$\{c_1, p_1, p_2, p_3\}$,
$\{c_2, p_1, p_4\}$,
$\{c_3, p_5\}$,
$\{c_2, p_5\}$,
$\{c_1, p_5, p_6\}$,
$\{c_3, p_2\}$.

On the basis of the selected commands and parameters, behavior patterns are formed each containing one command and one parameter describing that command:

$\{c_1, p_1\}, \{c_1, p_2\}, \{c_1, p_3\}, \{c_1, p_5\}, \{c_1, p_6\}$,
$\{c_2, p_1\}, \{c_2, p_4\}, \{c_2, p_5\}$,
$\{c_3, p_2\}, \{c_3, p_5\}$.

Next, on the basis of the patterns so formed, behavior patterns are formed in addition containing one parameter each and all the commands which can be described by that parameter:

$\{c_1, c_2, c_1)\}$,
$\{c_1, c_3, p_2\}$,
$\{c_1, c_2, c_3, p_5\}$,

After this, on the basis of the patterns so formed, behavior patterns are formed in addition containing several parameters each and all the commands which can be described by those parameters at the same time:

$\{c_1, c_2, p_1, p_5\}$.

In one variant aspect of the system, the commands and parameters are chosen from the behavior log on the basis of rules by which are selected at least:

every i-th command in succession and the parameters describing it, the increment "i" being specified in advance;

the commands executed after a predetermined period of time (for example, every tenth second) from the previous selected command, and the parameters describing them;

the commands and the parameters describing them that are executed in a predetermined time interval from the start of execution of the file;

the commands from a predetermined list and the parameters describing them;

the parameters from a predetermined list and the commands described by those parameters;

the first or the random k parameters of commands in the case when the number of command parameters is greater than a predetermined threshold value.

For example, from the behavior log one selects all the commands for working with a hard disk (such as CreateFile, ReadFile, WriteFile, DeleteFile, GetFileAttribute and so on) and all the parameters describing the selected commands.

In yet another example, from the behavior log one selects every thousandth command and all the parameters describing the selected commands In one variant aspect of the system, the behavior logs are formed in advance from at least two files, one of which is a safe file and the other a malicious file.

In yet another variant aspect of the system, each element of the behavior pattern is matched up with a characteristic such as the type of element of the behavior pattern. The type of element of the behavior pattern (command or parameter) is at least:

a "number range", if the element of the behavior pattern can be expressed as a number for example, for an element of the behavior pattern constituting the parameter $port_{html}=80$ of the connect command, the type of said element of the behavior pattern may be a "number value from 0x0000 to 0xFFFF", a "string", if the element of the behavior pattern can be expressed in the form of a string, for example, for an element of the behavior pattern constituting the connect command, the type of said element of the behavior pattern may be a "string less than 32 characters in size", if the element of the behavior pattern can be expressed in the form of data described by a predetermined data structure, the type of that element of the behavior pattern may be a "data structure"

for example, for an element of a behavior pattern constituting the parameter src=0x336b9a480d490982cdd93e2e49fdeca7 of the find_record command, the type of this element of the behavior pattern may be the "data structure MD5".

In yet another variant aspect of the system, the behavior pattern additionally includes, as elements of the behavior pattern, tokens formed on the basis of lexical analysis of said elements of the behavior pattern with the use of at least:

predetermined rules for the formation of lexemes, a previously trained recurrent neural network.

For example, with the aid of lexical analysis of the parameter

'c:\windows\system32\data.pass' on the basis of the rules for formation of lexemes:

if the string contains the path to a file, determine the disk on which the file is located;

if the string contains the path to a file, determine the folders in which the file is located;

if the string contains the path to a file, determine the file extension;

where the lexemes are:
the paths to the file;
the folders in which the files are located;
the names of the files;
the extensions of the files;
the tokens can be formed:
"paths to the file"→
'c:\',
"folders in which the files are located"→
'windows',
'system32',
'windows\system32',
"extensions of the files"→
'.pass'.

In yet another example, with the aid of lexical analysis of the parameters
'81.19.82.8', '81.19.72.38', '81.19.14.32'
on the basis of the rule for formation of lexemes:
if the parameters constitute IP addresses, determine the bit mask (or its analog, expressed by meta-characters) describing said IP addresses (i.e., the bit mask M for which the equality M∧IP=const is true for all those IPs);
the token can be formulated:
'81.19.*.*'.

In yet another example, from all available parameters comprising numbers, the tokens of the numbers are formed in predetermined ranges:
23, 16, 7224, 6125152186, 512, 2662162, 363627632, 737382, 52, 2625, 3732, 812, 3671, 80, 3200
sorting is done by ranges of numbers:
from 0 to 999
→{16, 23, 52, 80, 512, 812},
from 1000 to 9999
→{2625, 3200, 3671, 7224},
from 10000 on
{737382, 2662162, 363627632, 6125152186}

In yet another variant aspect of the system, tokens are formed from elements of a behavior pattern which consist of strings.

For example, the behavior pattern is a path to a file containing the names of the disk, the directory, the file, the file extension, and so forth. In this case, the token may be the name of the disk and the file extension.
C:\Windows\System32\drivers\acpi.sys
→
C:\
*.sys In one aspect, the convolution function forming module 122 is configured to:
form a convolution function from the behavior pattern such that the inverse convolution function of the result of that convolution function performed on the obtained behavior pattern will have a degree of similarity with the obtained behavior pattern greater than a specified value, i.e.:

$$r \sim g^{-1}(g(r))$$

where:
$r_i$ is the behavior pattern,
g is the convolution function,
$g^{-1}$ is the inverse convolution function
send the convolution function so formed to the detection model machine learning module 132.

In one variant aspect of the system, the convolution function forming module 122 is additionally configured to:

calculate the feature vector of a behavior pattern on the basis of the obtained behavior pattern, wherein the feature vector of the behavior pattern may be expressed as the sum of the hash sums of the elements of the behavior pattern; and/or form a convolution function from the feature vector of the behavior pattern, where the convolution function constitutes a hash function such that the degree of similarity of the calculated feature vector and the result of the inverse hash function of the result of that hash function of the calculated feature vector is greater than a predetermined value.

In yet another variant aspect of the system, the convolution function is formed by the metric learning method, i.e., such that the distance between the convolutions obtained with the aid of said convolution function for behavior patterns having a degree of similarity greater than a predetermined threshold value is less than a predetermined threshold value, while for behavior patterns having a degree of similarity less than the predetermined threshold value it is greater than the predetermined threshold value.

For example, the feature vector of the behavior pattern may be calculated as follows:
first an empty bit vector is created, consisting of 100000 elements (where one bit of information is reserved for each element of the vector);
1000 elements from the behavior pattern r are set aside for storing of data about the commands $c_i$, the remaining 99000 elements are set aside for the parameters $c_i$ of the behavior pattern r, wherein 50000 elements (from element 1001 to element 51000) are set aside for string parameters and 25000 elements (from element 51001 to element 76000) for number parameters;
each command $c_i$ of the behavior pattern r is matched up with a certain number $x_i$ from 0 to 999, and the corresponding bit is set in the vector so created
$v[x_i]$=true;
for each parameter $p_i$ of the behavior pattern r the hash sum is calculated by the formula:

$$y_i=1001+crc32(p_i)(\text{mod } 50000) \qquad \text{for strings:}$$

$$y_i=51001+crc32(p_i)(\text{mod } 25000) \qquad \text{for numbers:}$$

$$y_i=76001+crc32(p_i)(\text{mod } 24000), \qquad \text{for the rest:}$$

and depending on the calculated hash sum the corresponding bit is set in the created vector $v[y_i]$=true;

The described bit vector with the elements so set constitutes the feature vector of the behavior pattern r.

In yet another variant aspect of the system, the feature vector of the behavior pattern is computed by the following formula:

$$D = \sum_i b^i \times h(r_i)$$

where b is the base of the positional system of computation (for example, for a binary vector b=2, for a vector representing a string, i.e., a group of characters, b=8), $r_i$ is the i-th element of the behavior pattern, h is the hash function, where $0 \le h(r_i) < b$.

For example, the feature vector of the behavior pattern may be computed as follows:
first yet another empty bit vector is created (different from the previous example), consisting of 1,000 elements (where one bit of information is reserved for each element of the vector);
the hash sum for each pattern element r of the behavior pattern r is calculated by the formula:

$$x_i = 2^{crc32(r_i)(mod\ 1000)}$$

and depending on the computed hash sum, the corresponding bit is set in the created vector $v[x_i]$=true;

In yet another variant aspect of the system, the feature vector of the behavior pattern constitutes a Bloom filter.

For example, the feature vector of the behavior pattern may be computed as follows:
first yet another empty vector is created (different from the previous examples), consisting of 100000 elements;
at least two hash sums for each pattern element r of the behavior pattern r are calculated by means of a set of hash functions $\{h_j\}$ by the formula:

$$x_{ij} = h_j(r_i)$$

where:

$$h_j(r_i) = crc32(r_i),$$

$$h_j(0) = const_j$$

and depending on the computed hash sums, the corresponding elements are set in the created vector $v[x_{ij}]$= true.

In yet another variant aspect of the system, the size of the result of the formulated convolution function of the feature vector of the behavior pattern is less than the size of that feature vector of the behavior pattern.

For example, the feature vector constitutes a bit vector containing 100000 elements, and thus having a size of 12,500 bytes, while the result of the convolution function of said feature vector constitutes a set of 8 MD5 hash sums and thus has a size of 256 bytes, i.e., ~2% of the size of the feature vector.

In yet another variant aspect of the system, the degree of similarity of the feature vector and the result of the inverse hash function of the result of said hash function of the calculated feature vector constitutes a number value in the range of 0 to 1 and is calculated by the formula:

$$w = \frac{\sum(\{h(r_i)\} \wedge \{g_i\})}{\sum\{h(r_i)\}}$$

$$\{h(r_i)\} \wedge \{g_i\} \forall \{h(r_i)\} = \{g_i\}$$

where: $h(r_i) \wedge g_i$ signifies the congruence of $h(r_i)$ with $g_i$
and $\{h(r_i)\}$ is the set of results of the hash functions of the elements of the behavior pattern,
$\{g_i\}$ is the set of results of the inverse hash function of the result of the hash function of the elements of the behavior pattern,
$r_i$ is the i-th element of the behavior pattern,
h is the hash function,
w is the degree of similarity.

For example, the calculated feature vector constitutes the bit vector 101011100110010010110111011111101000100011001001001110101101101010001 100110110010001000000101110111001101011, the result of the convolution function of this feature vector is 1010011110101110101, and the result of the inverse convolution function of the above-obtained result is 10101110010001001011011110 01111101000100011001001010100011101011011011110001 1001101101000000010000001011101110011011011 (where the underline denotes elements different from the feature vector). Thus, the similarity of the feature vector and the result of the inverse convolution function is 0.92.

In yet another variant aspect of the system, the aforementioned hash function using an element of the behavior pattern as a parameter depends on the type of element of the behavior pattern:

$$h(r_i) = h_{r_i}(r_i).$$

For example, in order to compute the hash sum of a parameter from the behavior pattern constituting a string containing the path to the file, we use the hash function CRC32; for any other string, the Huffman algorithm; for a data set, the hash function MD5.

In yet another variant aspect of the system, the forming of the convolution function of the feature vector of a behavior pattern is done by an auto encoder, where the input data are the elements of that feature vector of the behavior pattern, and the output data are data having a coefficient of similarity to the input data greater than a predetermined threshold value.

In one aspect, the detection model creating module 131 is configured to:
create a detection model for malicious files, including at least:
(1) selection of a method for machine learning of the detection model;
initialization of the parameters of the teaching model, where the parameters of the teaching model initialized prior to the start of the machine learning of the detection model are known as hyper parameters;
dependent on the parameters of the files selected by the training selection preparation module 111;
send the teaching model so created to the detection model machine learning module 132.

For example, when selecting the method for machine learning of the detection model, at first a decision is made whether an artificial neural network or a random forest should be used as the detection model, and then if the random forest is chosen one selects the separating criterion for the nodes of the random forest. Or, if an artificial neural network is chosen, a method of numerical optimization of the parameters of the artificial neural network is selected. The decision as to the choice of a particular method for machine learning is made on the basis of the effectiveness of that method in the detecting of malicious files (i.e., the number of errors of the first and second kind occurring in the detecting of malicious files) with the use of input data (behavior patterns) of a predetermined kind (i.e., the data structure, the number of elements of the behavior patterns, the performance of the computing device on which the search is conducted for malicious files, the available resources of the computing device, and so on).

In yet another example, the method for machine learning of the detection model is selected on the basis of one or more of:
cross-testing, sliding check, cross-validation (CV);
mathematical validation of the criteria AIC, BIC and so on;
A/B testing, split testing;
stacking.

In yet another example, in the event of low performance of the computing device, a random forest is chosen, otherwise the artificial neural network is chosen.

In one variant aspect of the system, machine learning is performed for a previously created untrained detection model (i.e., a detection model in which the parameters of that model cannot produce, on the basis of analysis of the input data, output data with accuracy higher than a predetermined threshold value).

In yet another variant aspect of the system, the method of machine learning of the model of detection is at least:
- decision tree-based gradient boosting;
- the decision tree method;
- the K-nearest neighbor (kNN) method;
- the support vector machine (SVM) method.

In yet another variant aspect of the system, the detection model creating module 131 is additionally designed to create a detection model 133 on demand from the detection model machine learning module 132, where certain hyper parameters and methods of machine learning are chosen to be different from the hyper parameters and machine learning methods chosen for a previous detection model.

The detection model machine learning module 132 is configured to teach the detection model, in which the parameters of the detection model are computed with the use of the obtained convolution function on the obtained behavior patterns, where the detection model constitutes a set of rules for computing the degree of harmfulness of a file on the basis of at least one behavior pattern with the use of the computed parameters of that detection model.

For example, the detection model is trained with a known set of files selected by the training selection preparation module 111, wherein said set of files contains 60% safe files and 40% malicious files.

In one variant aspect of the system, the degree of harmfulness of a file constitutes a numerical value from 0 to 1, where 0 means that the file is safe, and 1 that it is malicious.

In yet another variant aspect of the system, a method of teaching the detection model is chosen which ensures a monotonic change in the degree of harmfulness of a file in dependence on the change in the number of behavior patterns formed on the basis of analysis of the behavior log.

For example, a monotonic change in the degree of harmfulness of a file means that, upon analyzing each subsequent behavior pattern, the calculated degree of harmfulness will be not less than the previously calculated degree of harmfulness (for example, after analysis of the 10th behavior pattern, the calculated degree of harmfulness is equal to 0.2; after analysis of the 50th behavior pattern, it is 0.4; and after analysis of the 100th behavior pattern it is 0.7).

In yet another variant aspect of the system, the detection model machine learning module 132 is additionally configured to:
- perform a check (e.g., verification) of the trained model of detection on the obtained behavior logs formed on the basis of analysis of files from a test selection of files, in order to determine the correctness of the determination of the harmfulness of files from the test selection of files;
- in event of a negative result of the check, send a request to one or more of:
  - the training selection preparation module 111 to prepare a selection of files different from the current one used for the teaching of the detection model; and
  - the detection model creating module 131 to create a new detection model, different from the current one.

The trained detection model is verified as follows. The detection model 133 has been taught on the basis of a set of files, selected by the training selection preparation module 111. It is previously known whether the set of files were safe or malicious. In order to verify that the detection model 133 has been trained correctly, i.e., that the detection model is able to detect malicious files and pass over safe files, the model is verified. For this purpose, the detection model is used to determine whether files from another set of files selected by the training selection preparation module 111 are malicious. The maliciousness of these files is known in advance. After applying the model to the new set of files, the system 100 determines how many malicious files were "missed" and how many safe files were detected. If the number of missed malicious files and detected safe files is greater than a predetermined threshold value, that detection model 133 is considered to be improperly trained and the detection model must be retrained using machine learning (for example, on another training selection of files, using values of the parameters of the detection model different from the previous ones, and so forth).

For example, when performing the verification of the trained model, the system 100 verifies the number of errors of the first and second kind in the detecting of malicious files from a test selection of files. If the number of such errors is greater than a predetermined threshold value, a new teaching and testing selection of files is selected and a new detection model is created.

In yet another example, the teaching selection of files contained 10,000 files, of which 8,500 were malicious and 1,500 were safe. After the detection model was taught, the system verified the model on a test selection of files containing 1,200 files, of which 350 were malicious and 850 were safe. According to the results of the verification, 15 out of 350 malicious files failed to be detected (4%), while 102 out of 850 safe files (12%) were erroneously considered to be malicious. In the event that the number of undetected malicious files exceeds 5% or accidentally detected safe files exceeds 0.1%, the trained detection model is considered to be improperly trained, according to one exemplary aspect.

In one variant aspect of the system, the behavior log 115 of the system 100 is additionally formed on the basis of a previously formed behavior log of the system and commands intercepted after the forming of said behavior log of the system.

For example, after the start of the execution of a file for which it is necessary to pronounce a verdict as to the harmfulness or safety of that file, the intercepted executable commands and the parameters describing the commands are recorded in the behavior log 115. On the basis of an analysis of these commands and parameters, the degree of harmfulness of that file is calculated by the system 100. If no verdict was pronounced as to the file being considered malicious or safe based on the results of the analysis, the system 100 continues intercepting commands. The intercepted commands and the parameters describing them are recorded in the old behavior log or in a new behavior log. In the first case, the degree of harmfulness is calculated on the basis of an analysis of all commands and parameters recorded in the behavior log, i.e., even those previously used to calculate the degree of harmfulness.

In one aspect, the system 100 is configured to:
- calculate the degree of harmfulness on the basis of the behavior log obtained from the behavior log forming module 112, and the detection model obtained from the detection model machine learning module 132, the degree of harmfulness of a file being a quantitative characteristic (for example, lying in the range from 0—the file has only safe behavior—to 1—the file has predetermined malicious behavior), describing the malicious behavior of the executable file; and/or send the calculated degree of harmfulness to determine resource allocation.

The system 100 is also designed to, in one aspect, allocate computing resources of the computer system, on the basis of analysis of the obtained degree of harmfulness, for use in assuring the security of the computer system.

In one variant aspect of the system 100, the computing resources of the computer system include at least:
the volume of free RAM;
the volume of free space on the hard disks; and/or
the free processor time (quanta of processor time) which can be spent on the antivirus scan (for example, with a greater depth of emulation).

In yet another variant aspect of the system, the analysis of the degree of harmfulness consists in determining the dynamics of the change in the value of the degree of harmfulness after each of the preceding calculations of the degree of harmfulness and at least:
allocating additional resources of the computer system in event of an increase in the value of the degree of harmfulness; and/or
freeing up previously allocated resources of the computer system in event of a decrease in the value of the degree of harmfulness.

Figure 2:
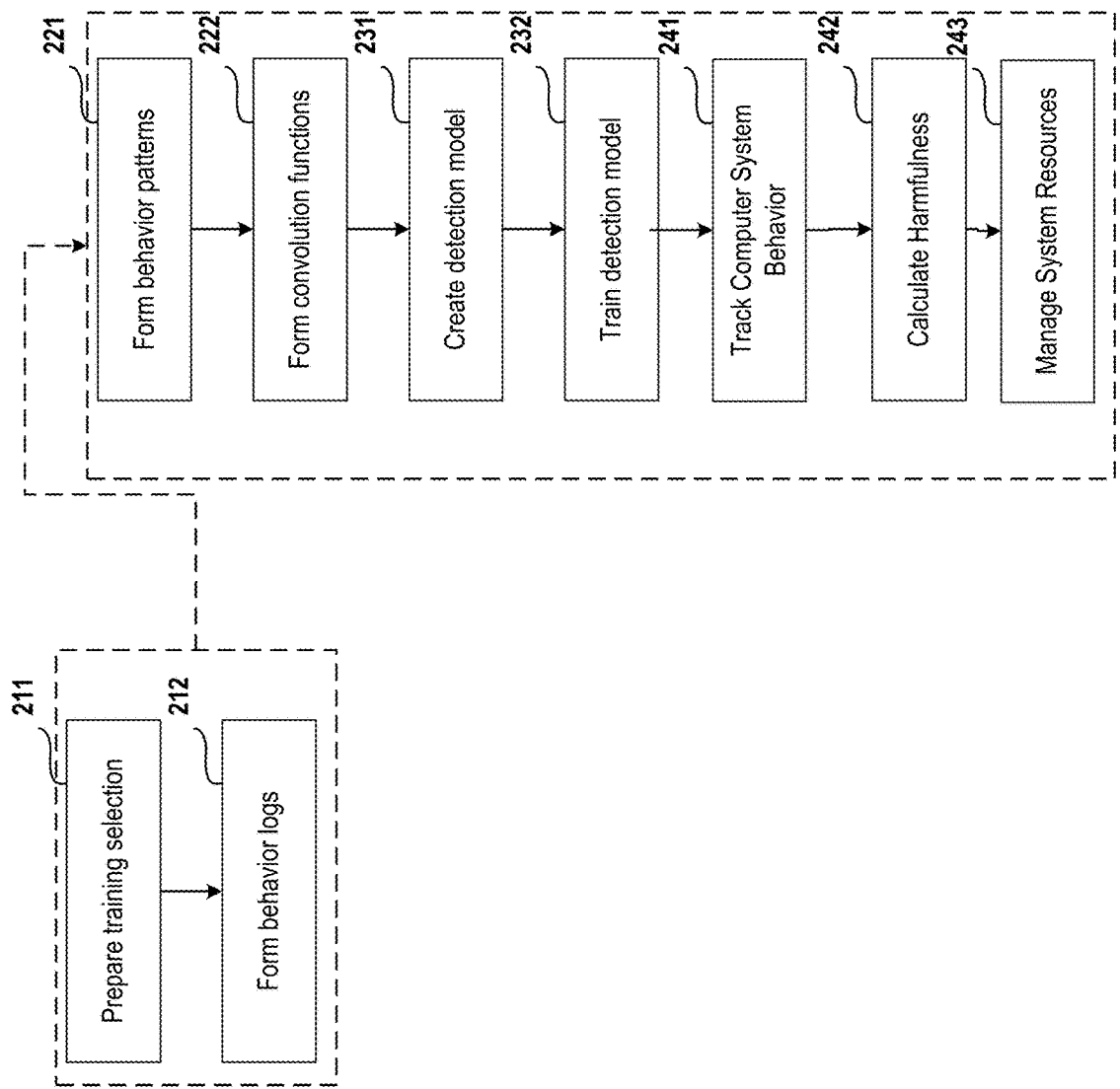
FIG. 2 is a flow diagram of a method for machine learning of a model for detection of malicious files, in accordance with exemplary aspects of the present disclosure.

FIG. 2 shows a structural diagram of a method 200 for machine learning of a model for detection of malicious files, in accordance with exemplary aspects of the present disclosure.

The structural diagram of the method 200 for machine learning of a model for detection of malicious files contains a step 211 in which teaching selections of files are prepared, a step 212 in which behavior logs are formed, a step 221 in which behavior patterns are formed, a step 222 in which convolution functions are formed, a step 231 in which a detection model is created, a step 232 in which the detection model is trained, a step 241 in which the behavior of the computer system is tracked, a step 242 in which the degree of harmfulness is calculated, and a step 243 in which the resources of the computer system are managed.

In step 211, the training selection preparation module 111 is used to select at least one file from a database of files 113 according to predetermined criteria, wherein the teaching of the detection model will be done in step 232 on the basis of the selected files.

In step 212, the behavior log forming module 112 is used:
to intercept at least one command at least during:
the execution of the file selected in step 211,
the emulation of the working of the file selected in step 211;
to determine for each intercepted command at least one parameter describing that command;
to form, on the basis of the commands intercepted and the parameters determined, a behavior log of the obtained file, wherein the behavior log represents a set of intercepted commands (hereinafter, the command) from the file, where each command corresponds to at least one defined parameter describing that command (hereinafter, the parameter).

In step 221, the behavior pattern forming module 121 forms at least one behavior pattern on the basis of the commands and parameters selected from the behavior log formed in step 212. The behavior log 115 represents a group of executable commands (hereinafter, the command) from the file, where each command corresponds to at least one parameter describing that command (hereinafter, the parameter). The behavior pattern is a set of at least one command and such a parameter, which describes all the commands from that set, in one aspect.

In step 222, the convolution function forming module 122 forms a convolution function of the behavior pattern formed in step 221 so that the inverse convolution function of the result of this convolution function performed on that behavior pattern will have a degree of similarity to the aforementioned behavior pattern greater than a specified value.

In step 231, the detection model creating module 131 creates a detection model, that comprises one or more of:
selecting a method of machine learning of the detection model;
initializing the parameters of the teaching model, where the parameters of the teaching model initialized prior to the start of the machine learning of the detection model are known as hyper parameters;
dependence on the parameters of the files selected in step 211.

In step 232, the detection model machine learning module 132 teaches the detection model created in step 231. The parameters of that detection model are calculated with the use of the convolution function formed in step 222, performed on the behavior patterns formed in step 221. The detection model constitutes a group of rules for calculating the degree of harmfulness of a file on the basis of at least one behavior pattern with the use of the calculated parameters of that detection model.

In step 241, the behavior log forming module 112:
intercepts at least one command being executed by the files running in the computer system;
forms a behavior log of the system on the basis of the intercepted commands.

In step 242, the degree of harmfulness is calculated on the basis of the behavior log of the system formed in step 241, and the detection model trained in step 232.

In step 243, the computing resources are allocated on the basis of the analysis of the degree of harmfulness as calculated in step 242, for use in assuring the security of the computer system.

Figure 3:
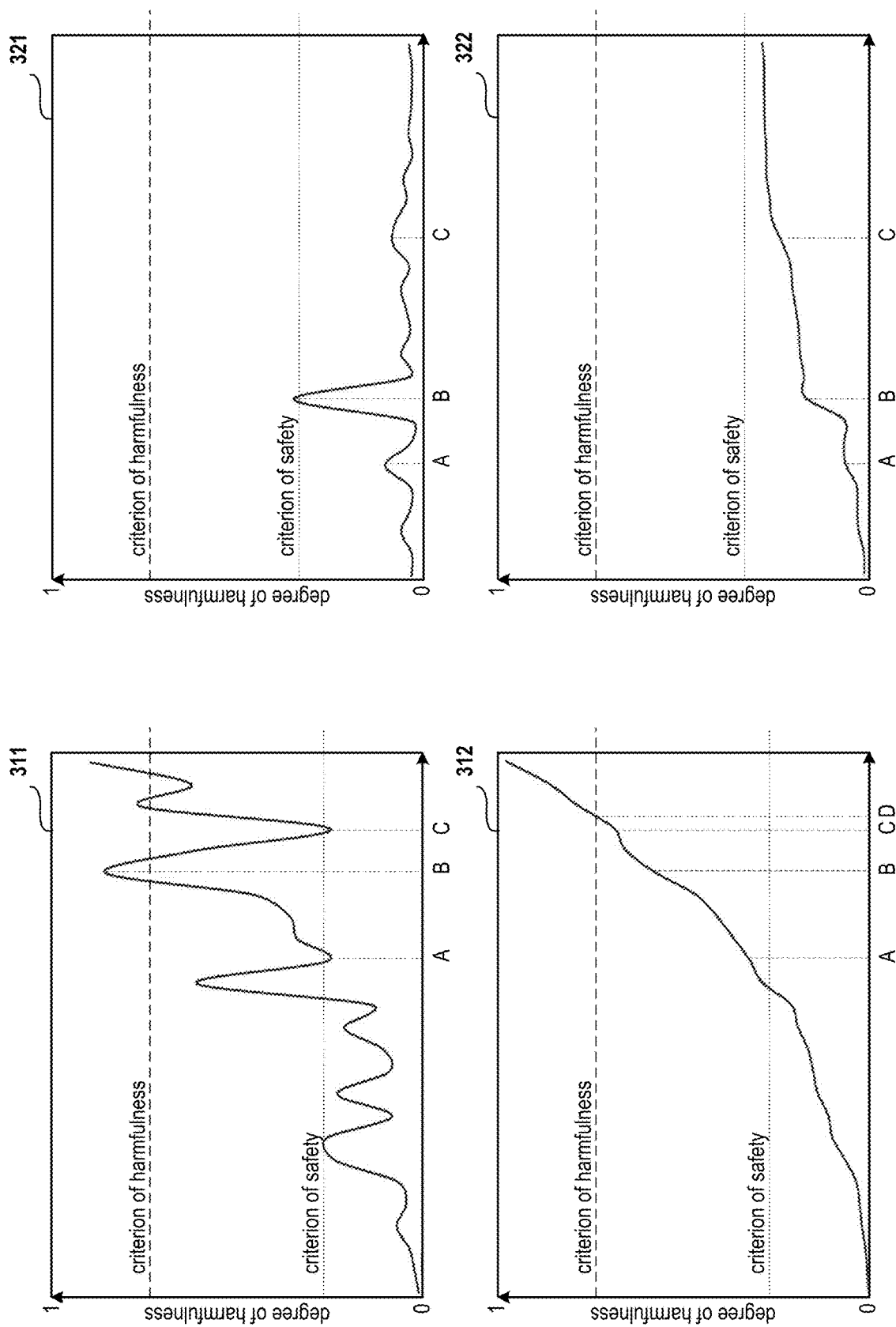
FIG. 3 shows examples of the dynamics of change in the degree of harmfulness as a function of the number of behavior patterns, in accordance with exemplary aspects of the present disclosure.

FIG. 3 shows examples of the dynamics of change in the degree of harmfulness as a function of the number of behavior patterns.

The graph 311 illustrates the dynamics of change in the degree of harmfulness as a function of the number of behavior patterns contain a graph of the dynamics of an arbitrary change in the degree of harmfulness as a function of the number of behavior patterns formed during the execution of a malicious file. The graph 312 illustrates the dynamics of monotonic change in the degree of harmfulness as a function of the number of behavior patterns formed during the execution of a malicious file. The graph 321 illustrates the dynamics of an arbitrary change in the degree of harmfulness as a function of the number of behavior patterns formed during the execution of a safe file. The graph 322 illustrates the dynamics of monotonic change in the degree of harmfulness as a function of the number of behavior patterns formed during the execution of a safe file.

In one variant aspect of the system, the degree of harmfulness of an executable file takes on a value in the range of 0 (the file has exclusively safe behavior) to 1 (the file has predetermined malicious behavior).

The graph 311 shows the dynamics of an arbitrary change in the degree of harmfulness as a function of the number of behavior patterns formed during the execution of a malicious file.

In the beginning, upon executing that file, the number of behavior patterns formed is not large, and what is more the malicious activity of the executable file might be absent or minimal (for example, an initialization of data occurs, which is natural to many files, including safe ones), so that the calculated degree of harmfulness differs slightly from 0 and does not exceed a predetermined threshold value (hereinafter, the criterion of safety), after passing which the behavior of the executable file ceases to be considered safe (on the graph, this threshold value is designated by a dotted line).

However, as time goes on the malicious activity of the executable file grows and the degree of harmfulness begins to approach 1, surpassing the criterion of safety, while the degree of harmfulness might not reach the predetermined threshold value (hereinafter, the criterion of harmfulness) after the passing of which the behavior of the executable file will be considered to be malicious (in the graph, this threshold value is designated by a dashed line).

After a period of growth, the malicious activity may cease and the degree of harmfulness will again tend toward 0 (time A). At a certain time, the degree of harmfulness will become greater than the criterion of harmfulness (time B) and the behavior of the executable file will be recognized as malicious and in consequence the file itself will be recognized as malicious.

The time of recognizing the file as malicious might occur significantly later than the start of growth in malicious activity, since the described approach responds well to an abrupt growth in the degree of harmfulness, which occurs most often during prolonged, clearly manifested malicious activity of the executable file.

In the event that the malicious activity occurs episodically (left side of the graph 311), the calculated degree of harmfulness might not reach the value/threshold afterwhich a verdict is pronounced as to the harmfulness of the behavior of the executable file, and consequently the harmfulness of the executable file itself.

In the case when the degree of harmfulness is not calculated on the basis of each behavior pattern formed (for example, because the performance of the computing device is not high), a situation is possible where the degree of harmfulness will be calculated at time A (when the malicious activity commences) and time C (when the malicious activity ends), but will not be calculated at time B (when malicious activity is occurring). The calculated degrees of harmfulness will not exceed the criterion of harmfulness, the activity of the executable file will not be recognized as malicious, and consequently the malicious file will not be detected.

The graph 312 shows the dynamics of monotonic change in the degree of harmfulness as a function of the number of behavior patterns formed during the execution of a malicious file.

In the beginning, upon executing said file, the number of behavior patterns formed is not large, and what is more the malicious activity of the executable file might be absent or minimal (for example, an initialization of data occurs, which is natural for many files, including safe ones), so that the calculated degree of harmfulness differs little from 0 and does not exceed the predetermined threshold value (hereinafter, the criterion of safety), after passing which the behavior of the executable file ceases to be considered safe (on the graph, this threshold value is designated by a dotted line).

However, as time goes on the malicious activity of the executable file grows and the degree of harmfulness begins to approach 1, surpassing the criterion of safety, while the degree of harmfulness might not reach a predetermined threshold value (hereinafter, the criterion of harmfulness) after the passing of which the behavior of the executable file will be considered to be malicious (in the graph, this threshold value is designated by a dashed line).

After a period of growth (times A-B), the malicious activity may cease (times B-A) yet the degree of harmfulness will not decline, but only continue to grow during any malicious activity of the executable file. At a certain time, the degree of harmfulness will become greater than the criterion of harmfulness (time D) and the behavior of the executable file will be recognized as malicious and in consequence the file itself will be recognized as malicious.

The time of recognizing the file as malicious might occur immediately after the manifesting of malicious activity, since the described approach responds well to a smooth growth in the degree of harmfulness, which occurs both during prolonged, clearly manifested malicious activity of the executable file, and during frequent, episodic, less pronounced malicious activity.

In the event that the malicious activity occurs episodically (left side of the graph 312), the calculated degree of harmfulness over time might reach the value after which a verdict is pronounced as to the harmfulness of the behavior of the executable file and the harmfulness of the executable file itself.

In the case when the degree of harmfulness is calculated not on the basis of each behavior pattern formed (for example, because the performance of the computing device is not high), a situation is possible where the degree of harmfulness will be calculated at time A (when the malicious activity commences) and time C (when the malicious activity ends), but will not be calculated at time B (when malicious activity is occurring), nevertheless since the degree of harmfulness changes monotonically, the calculated degrees of harmfulness will only increase their values and at time C the degree of harmfulness will exceed the criterion of harmfulness, the activity of the executable file will be recognized as malicious, and consequently the malicious file will be detected.

The graph 321 shows the dynamics of an arbitrary change in the degree of harmfulness as a function of the number of behavior patterns formed during the execution of a safe file.

In the beginning, upon executing said file, the number of behavior patterns formed is not large, and what is more there is no malicious activity as such from the executable file, although "suspicious" actions might be executed, which may also be performed during the execution of malicious files (for example, deletion of files, transfer of data in a computer network, and so on), therefore the calculated degree of harmfulness differs from 0 and does not exceed a predetermined threshold value (hereinafter, the criterion of safety), after passing which the behavior of the executable file ceases to be considered safe (on the graph, this threshold value is designated by a dotted line).

However as time goes on, the malicious activity of the executable file grows because of the execution of a large number of "suspicious" commands. The degree of harmfulness begins to approach 1 and while the degree of harmfulness might not reach a predetermined threshold value (hereinafter, the criterion of harmfulness) after the passing of which the behavior of the executable file will be considered to be malicious (in the graph, this threshold value is designated by a dashed line), it may exceed the criterion of safety, so that the file may cease to be considered safe and become "suspicious".

After a period of growth, the malicious activity may cease and the degree of harmfulness will again tend toward 0 (time C).

In the case when the degree of harmfulness is not calculated on the basis of each behavior pattern formed (for example, because the performance of the computing device is not high), a situation is possible where the degree of harmfulness will be calculated at time B (when the activity is most similar to malicious, i.e., becomes "suspicious") but not at time A (when the "suspicious" activity increases) or at time C (when the "suspicious" activity is decreasing). In this situation, the calculated degree of harmfulness will exceed the criterion of safety and the activity of the executable file will be recognized as "suspicious" (it will not be considered safe), and consequently the file previously considers safe will not be recognized as safe.

The graph 322 shows the dynamics of monotonic change in the degree of harmfulness as a function of the number of behavior patterns formed during the execution of a safe file.

In the beginning, upon executing said file, the number of behavior patterns formed is not large. Furthermore there is no malicious activity from the executable file, although "suspicious" actions might be executed, which may also be performed during the execution of malicious files (for example, deletion of files, transfer of data in a computer network, and so on). Therefore the calculated degree of harmfulness is not 0 and does not exceed a predetermined threshold value (hereinafter, the criterion of safety). If the degree of harmfulness exceeded the criterion of safety, the behavior of the executable file ceases to be considered safe (on the graph, this threshold value is designated by a dotted line).

However, as time goes on the malicious activity of the executable file grows on account of the execution of a large number of "suspicious" commands and the degree of harmfulness begins to approach 1. The degree of harmfulness might not reach a predetermined threshold value (hereinafter, the criterion of harmfulness) after the passing of which the behavior of the executable file will be considered to be malicious (in the graph, this threshold value is designated by a dashed line). Also the criterion for harmfulness might not exceed the criterion of safety, therefore the file will continue to be considered safe.

After a period of growth (times A-B), the malicious activity may cease (times B-A) yet the degree of harmfulness will not decline. Instead, the degree of harmfulness continues to grow during any malicious activity of the executable file, yet does not exceed the coefficient of safety. In this manner, the activity of the executable file will be regarded as safe and in consequence the file will be regarded as safe.

When the degree of harmfulness is calculated not on the basis of each behavior pattern formed (for example, because the performance of the computing device is not high), a situation is possible where the degree of harmfulness will be calculated at time B (when the activity is most similar to malicious, i.e., becomes "suspicious") but not at time A (when the "suspicious" activity increases) or at time C (when the "suspicious" activity is decreasing). Nevertheless since the degree of harmfulness changes monotonically, the calculated degrees of harmfulness will only increase their values, at times A, B, C the degrees of harmfulness will not exceed the criterion of safety, the activity of the executable file will be recognized as safe, and consequently the safe file will be recognized as safe.

The file may not be recognized as "suspicious" after "suspicious" activity has manifest itself. Since the described approach affords a smooth growth in the degree of harmfulness, this makes it possible to avoid sharp peaks in the growth of the degree of harmfulness.

Figure 4:
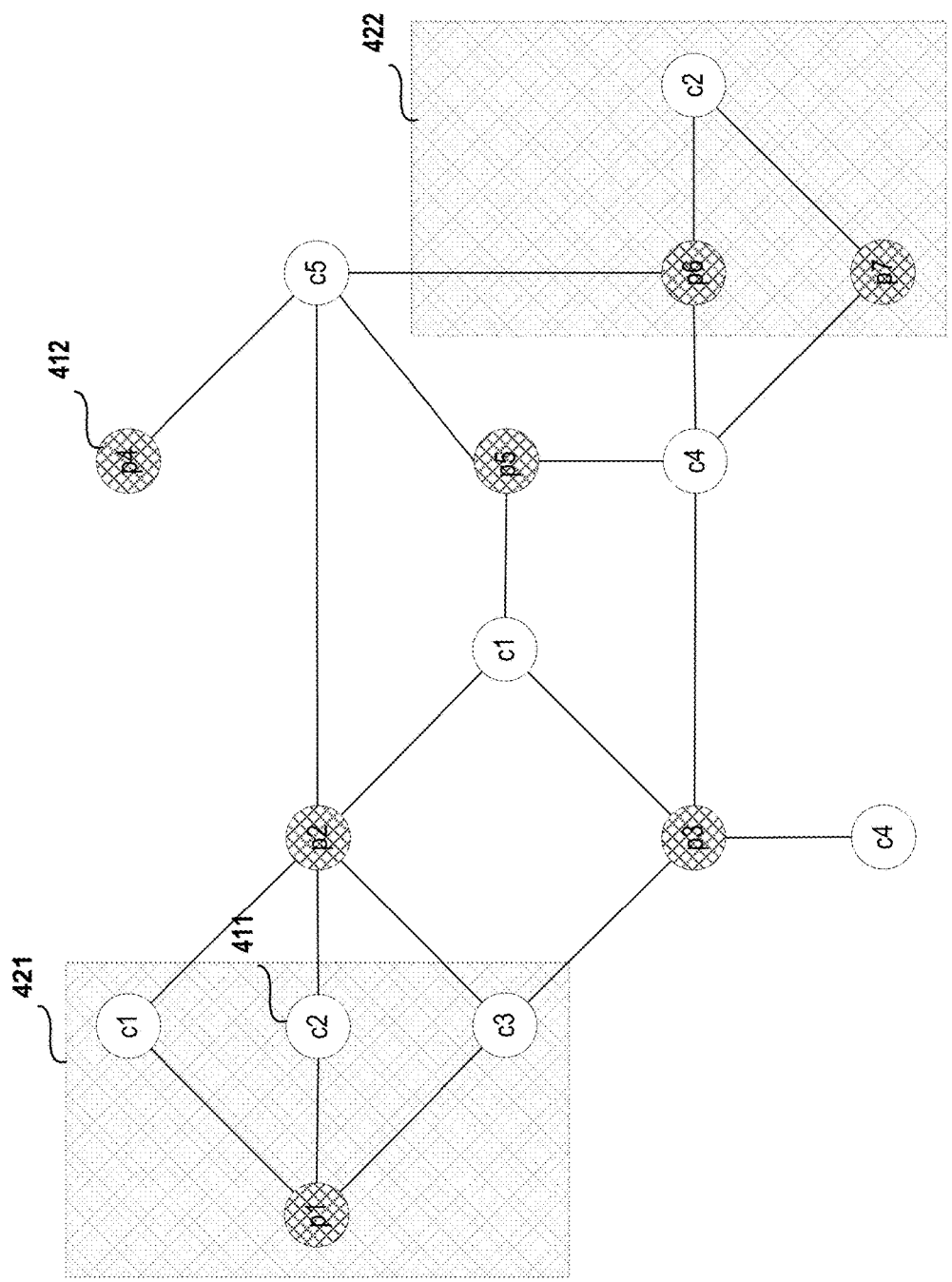
FIG. 4 shows an example of a diagram of relations between elements of behavior patterns, in accordance with exemplary aspects of the present disclosure.

FIG. 4 shows an example of a diagram of relations between elements of behavior patterns, in accordance with exemplary aspects of the present disclosure.

The example of the diagram of relations between elements of behavior patterns contains commands 411 (clear circles), parameters 412 (hatched circles), an example of a behavior pattern with one parameter 421 and an example of a behavior pattern with one command 422.

During the execution of a file, the commands 411 were intercepted and the parameters 412 describing them were determined:

CreateFile 0x24e0da54'.dat'
{c1, p1, p2}
ReadFile 0x24e0da54'.dat'
{c2, p1, p2}
DeleteFile 0x24e0da54'.dat' 'c:\'
{c3, p1, p2, p3}
CreateFile 0x708a0b32'.dat'0x3be06520
{c1, p2, p3, p5}
WriteFile 0x708a0b32
{c4, p3}
WriteFile 0x708a0b32 0x3be06520 0x9902a18d1718b5124728f9 0
{c4, p3, p5, p6, p7}
CopyMemory 0x3be06520 0x9902a18d1718b5124728f9
{c5, p4, p5, p6}
ReadFile 0x9902a18d1718b5124728f9 0
{c2, p6, p7}

On the basis of those commands 411 and parameters 412, behavior patterns (421, 422) are formed and the relations between the elements of the behavior patterns are determined.

In a first step, patterns are formed containing one command 411 and one parameter 412 describing that command:

| | |
|---|---|
| {c1, p1} | {c3, p2} |
| {c1, p2} | {c3, p3} |
| {c1, p3} | {c4, p3} |
| {c1, p5} | {c4, p5} |
| {c2, p1} | {c4, p6} |
| {c2, p2} | {c4, p7} |
| {c2, p6} | {c5, p4} |
| {c2, p7} | {c5, p5} |
| {c3, p1} | {c5, p6} |

In the example shown, 19 behavior patterns have been formed on the basis of 8 intercepted commands (with the parameters describing them).

In the second step, patterns are formed which contain one parameter 412 and all the commands 411 which can be described by that parameter 412:

| | |
|---|---|
| {c1, c2, c3, p1} | {c1, c3, c4, p3} |
| {c1, c2, c3, p2} | {c5, p4} |
| {c1, c4, c5, p5} | {c2, c4, p7} |
| {c2, c4, c5, p6} | |

In the example shown, 7 behavior patterns have been formed in addition on the basis of 8 intercepted commands (with the parameters describing them).

In the third step, patterns are formed which contain several parameters 412 and all the commands 411 which can be described by those patterns 412:

---
{c1, c2, c3, p1, p2}   {c2, c4, p6, p7}
{c4, c5, p5, p6}
---

In the example given, three behavior patterns have been formed in addition on the basis of eight intercepted commands (with the parameters describing them).

Figure 5:
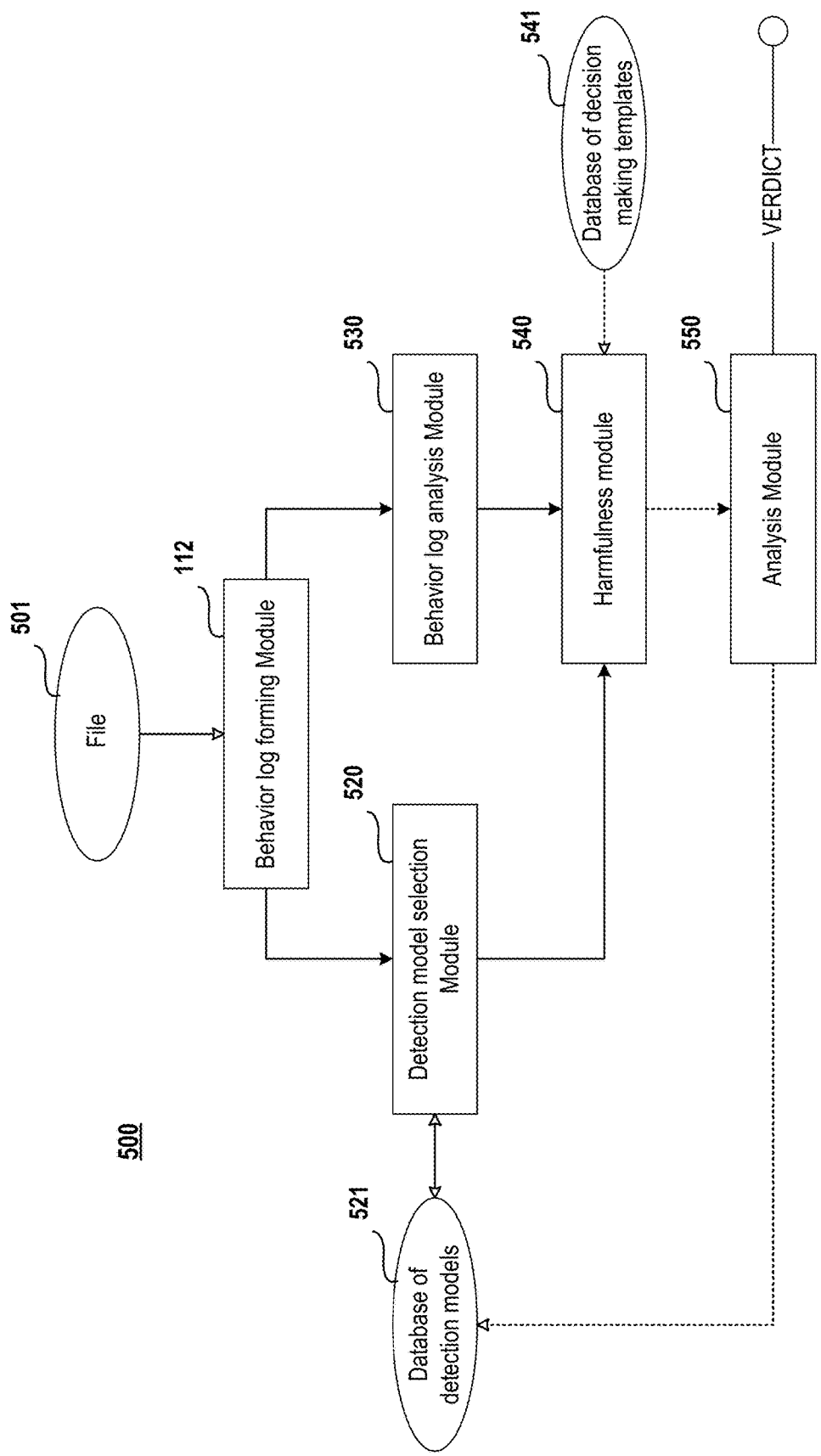
FIG. 5 is a structural diagram of a system for detection of malicious files with the use of a trained model of detection of malicious files, in accordance with exemplary aspects of the present disclosure.

FIG. 5 shows a structural diagram of a system of detection of malicious files with the use of a trained model of detection of malicious files, in accordance with exemplary aspects of the present disclosure.

The structural diagram of the system 500 of detection of malicious files with the use of a trained model of detection of malicious files consists of the file being analyzed 501, a behavior log forming module 112, a detection model selection module 520, a database of detection models 521, a behavior log analysis module 530, a harmfulness module 540, a database of decision templates 541 and an analysis module 550.

In one variant aspect of the system, the system additionally contains a behavior log forming module 112 of the file being executed, which is configured to:
  intercept at least one command at least during:
  a) the execution of the file 501; and/or
  b) the emulation of the execution of the file 501;
  determine for each intercepted command at least one parameter describing that command;
  form on the basis of the intercepted commands and the determined parameters a behavior log for that file, where the intercepted commands and the parameters describing them are recorded in the behavior log in chronological order from the earliest intercepted command to the most recent intercepted command (hereinafter, writing in the behavior log);
  send the formulated behavior log to the behavior log analysis module 530 and the detection model selection module 520.

In yet another variant aspect of the system 500, the behavior log is a set of executable commands (hereinafter: command) of the file 501, where each command corresponds to at least one parameter describing that command (hereinafter: parameter).

In yet another variant aspect of the system, the intercepting of commands of the file being executed 501 and the determination of the parameters of the intercepted commands is performed on the basis of an analysis of the performance of the computing device on which the system for detecting of malicious files with the use of a trained model of detection of malicious files is running, including at least:
  a determination as to whether it is possible to analyze the file being executed 501 for harmfulness (carried out with the aid of the analysis behavior log analysis module 530, the harmfulness module 540 and the analysis module 550) up to the time when the next command will be intercepted;
  a determination as to whether the analysis of the file being executed 501 for harmfulness will result in a lowering of the computing resources of that computing device below a predetermined threshold value, the resources of the computing device being at least:
    the performance of that computing device;
    the volume of free RAM of that computing device;
    the volume of free space on information storage media of that computing device (such as hard disks);
    the bandwidth of the computer network to which that computing device is connected.

In order to increase the performance of the system of detection of malicious files with the use of a trained model of detection of malicious files it may be necessary to analyze a behavior log not containing all the executable commands of the file being executed 501, since the entire sequence of actions carried out to analyze the file 501 for harmfulness takes up more time than the interval between two consecutively executed commands of the file being executed 501.

For example, the commands of the file being executed 501 are carried out (and consequently intercepted) every 0.001 s, but the analysis of the file 501 for harmfulness takes 0.15 s, so that all the commands intercepted during that interval of time will be ignored, and thus it is enough to intercept only every 150th command.

In one aspect, the detection model selection module 520 is configured to:
  select from the database of detection models 521 at least two models of detection of malicious files on the basis of the commands and parameters selected from the behavior log of the file being executed 501, the model of detection of malicious files being a decision-making rule to determine the degree of harmfulness
  send all selected models of detection of malicious files to the harmfulness module 540.

In one variant aspect of the system, the models of detection of malicious files kept in the database of detection models 521 have been previously trained by the method of machine learning on at least one safe file and at least one malicious file.

The model of detection of malicious files is described in greater detail in FIG. 1 to FIG. 4.

In yet another variant aspect of the system 500, the method of machine learning of the detection model is at least:
  decision tree-based gradient boosting;
  the decision tree method;
  the K-nearest neighbor (kNN) method;
  the support vector machine (SVM) method In yet another variant aspect of the system, the method of teaching the model for detection ensures a monotonic variation in the degree of harmfulness of the file in dependence on the variation in the number of behavior patterns formulated on the basis of the analysis of the behavior log.

For example, the calculated degree of harmfulness of the file 501 might only increase monotonically or not change in dependence on the number of behavior patterns formed on the basis of the analysis of the behavior log of that file 501. At the start of the execution of the file 501, the number of behavior patterns formed is insignificant, and the calculated degree of harmfulness of that file 501 will differ little from 0. As time goes on, the number of patterns formed will increase and the calculated degree of harmfulness of that file 501 will also increase, or if there is no malicious activity of that file 501 the calculated degree of harmfulness will remain unchanged. Thus, whenever the degree of harmfulness of the file is calculated during the execution of a malicious file 501 (or from whatever record of the behavior log the forming of the behavior patterns began), it will reflect whether malicious activity of the file 501 has occurred or not up to the time of calculation of that degree of harmfulness.

In yet another variant aspect of the system, each model of detection of malicious files selected from the database of detection models 521 is trained to detect malicious files with predetermined unique characteristic features.

For example, the detection models kept in the database of detection models 521 may be trained to detect files:
- having a GUI—graphical user interface;
- exchanging data in a computer network;
- encrypting files (such as malicious files of the "Trojan-Cryptors" family);
- using network vulnerabilities for their propagation (such as malicious files of the "Net-Worms" family), p2P networks (such as malicious files of the "P2P-Worms" family), and so forth.

Thus, the malicious file may be detected with the use of several trained models for detection of malicious files. For example, the malicious file "WannaCry.exe" which when executed encrypts data on a user's computing device and sends copies of itself to other computing devices connected to the same computer network as the user's computing device on which the file was executed can be detected with the aid of detection model #1, trained to detect files utilizing vulnerabilities, detection model #2, trained to detect files designed to encrypt files, and detection model #3, trained to detect files containing text information interpretable as demands being made (for example, as to a form of payment, sums of money, and so forth). The degrees of harmfulness calculated with the aid of those models, as well as the times when the calculated degrees of harmfulness surpass the predetermined threshold value, might differ from each other. For example, the results of using the models for detection of malicious files by means of which it was possible to detect the malicious file 501 may be expressed in the following table:

TABLE #1

| detection model | limit degree of harmfulness | command No. from behavior log |
|---|---|---|
| model #1 | 0.95 | 374 |
| model #2 | 0.79 | 288 |
| model #3 | 0.87 | 302 |

File 501 is recognized as malicious in the event that the calculated degree of harmfulness is greater than 0.78. The degree of harmfulness (such as 0.78) characterizes the probability that the file for which the degree of harmfulness was calculated may prove to be malicious (78%) or safe (22%). If the file 501 can be recognized as being malicious with the use of several models for detection of malicious files, there is a higher probability that the file 501 will prove to be malicious. For example, for the models of detection of malicious files whose data is presented in Table #1, the summary degree of harmfulness can be calculated by the formula:

$$w_{total}=1-\Pi_i^n(1-w_i)=0.999685,$$

where
- $w_{total}$—is the summary degree of harmfulness,
- $w_i$—is the degree of harmfulness calculated with the use of model i,
- n—is the number of models for detection of malicious files used to calculate the summary degree of harmfulness.

Thus, the obtained summary degree of harmfulness (0.999685) is significantly higher than the predetermined threshold value, the calculated degree of harmfulness passing this threshold (0.78) meaning the file is recognized as malicious. That is, the use of several models for detection of malicious files allows substantially higher accuracy of determination of malicious files, and fewer errors of the first and second kind occurring during the detecting of malicious files.

In yet another example, the use of several models for detecting of malicious files allows the summary degree of harmfulness to attain the predetermined threshold value, a calculated degree of harmfulness beyond this value meaning that a file is recognized as malicious much sooner than when using each of the models for detecting of malicious files separately. For example, for the models for detecting of malicious files whose data are presented in Table #1, given that the calculated degrees of harmfulness vary monotonically, the number of the command from the behavior log after which the file will be recognized as malicious can be calculated by the formula:

$$I_{detect}=\Pi_i^n F(w_i,I_i)=207,$$

where
- $I_{detect}$—is the number of the command from the behavior log after analysis of which the file will be recognized as malicious,
- $I_i$— is the number of the command from the behavior log after analysis of which using the model i the file will be recognized as malicious,
- $w_i$—is the degree of harmfulness calculated with the use of model i,
- n—is the number of models for detection of malicious files used to calculate the number of the command from the behavior log after analysis of which the file will be recognized as malicious.

Thus, the obtained summary number of the command from the behavior log (207) is much lower than the earliest number of the command from the behavior log (288) after analysis of which the file was recognized as malicious by one of the models for detection of malicious files (model #2). That is, the use of several models for detection of malicious files may substantially increase the speed (i.e., the efficiency) of detection of malicious files.

In yet another example, the different detection models kept in the database of detection models 521 may be trained to detect malicious files with several not necessarily unique predetermined characteristic features, i.e., the detection model #1 can detect files having a graphical user interface and exchanging data in a computer network, while model #2 can detect files exchanging data in a computer network and propagating in that computer network with the use of network vulnerabilities. Both of those detection models can detect the aforementioned malicious file "WannaCry.exe" thanks to the common characteristic trait of the file propagating in a computer network with the use of network vulnerabilities.

In yet another variant aspect of the system, one selects from the database of detection models 521 a model for detection of malicious files that was trained on files during whose execution there occurs at least:
- the execution of the same commands as the commands selected from the behavior log of the file being executed 501;
- the utilization of the same parameters as the parameters selected from the behavior log of the file being executed 501.

For example, from the behavior log there are selected the commands "CreateFileEx", "ReadFile", "WriteFile", and "CloseHandle", which are used for the modification of files, including the encrypting of files. From the database of detection models 521 there will be selected a detection model trained for use in detecting malicious files of the "Trojan-Cryptors" family.

In yet another example, from the behavior log there are selected the parameters "8080" and "21", which describe commands working with a computer network (for example, connect, where the above described parameters are connection ports to an electronic address). From the database of detection models 521 there will be selected a detection model trained for use in detecting files exchanging data in a computer network.

In this aspect, the behavior log analysis module 530 is configured to:
form at least one behavior pattern on the basis of the commands and parameters selected from the behavior log of the file being executed 501, where the behavior pattern is a set of at least one command and a parameter which describes all the commands from that set;
compute the convolution of all the behavior patterns formed;
send the formed convolution to the harmfulness module 540 of the file being executed.

In one variant aspect of the system, the calculating of the convolution of the formed behavior patterns is based on a predetermined convolution function, such that the inverse convolution function of the result of that convolution function performed on all of the formed behavior patterns has a degree of similarity to that behavior pattern greater than a predetermined threshold value.

The formation and use of the convolution functions (calculation of the convolution) is described more closely in FIG. 1 and FIG. 2.

In one aspect, the harmfulness module 540 is designed to:
calculate the degree of harmfulness of the file being executed 501 on the basis of an analysis of the obtained convolution with the aid of each obtained model of detection of malicious files;
send each calculated degree of harmfulness to the analysis module 550.

In one variant aspect of the system, the decision making template is a composition of the degrees of harmfulness.

For example, the composition of the degrees of harmfulness calculated on the basis of the models #1, #2, #3, described above, can be represented as an aggregate of pairs {0.95, 374}, {0.79, 288}, {0.87, 302}.

In yet another example, the composition of the degrees of harmfulness calculated on the basis of the models #1, #2, #3, described above, can represent a measure of the central tendency of the calculated degrees of harmfulness (such as the arithmetic mean, in the given case 0.87).

In yet another example, the composition of the degrees of harmfulness represents the change in the degrees of harmfulness as a function of time or the number of behavior patterns used to calculate the degree of harmfulness.

In one aspect, the analysis module 550 is designed to:
form a decision making template on the basis of the obtained degrees of harmfulness;
recognize the file being executed 501 as malicious in the event that the degree of similarity between the formed decision making template and at least one of the predetermined decision making templates from a database of decision making templates 541, previously formed on the basis of an analysis of malicious files, is greater than a predetermined threshold value.

In one variant aspect of the system, the decision making template is an aggregate of the degrees of harmfulness obtained from the harmfulness module 540.

In yet another variant aspect of the system, the decision making template is the degree of harmfulness as a function of time or the number of behavior patterns used to calculate that degree of harmfulness.

In yet another variant aspect of the system, the decision making templates from the database of decision making templates 541 are formed on the basis of an analysis of malicious files used for the training of models from the database of detection models 521.

For example, on the basis of 100,000 files, of which 75,000 are safe files and 25,000 are malicious files, the detection models are trained (including testing) and then saved in the database of detection models 521. After the models for detection of malicious files have been trained, they are used to form the decision making templates for some (or all) of the aforementioned 25,000 malicious files, which are then entered into the database of decision making templates 541. That is, a machine learning of the models for detection of malicious files is first carried out on a teaching and testing sample of files. As a result, several models for detection of malicious files can be trained, each of which will be trained for the detecting of malicious files with unique predetermined characteristic traits. After all of the detection models have been trained, one determines which of the trained models for detecting of malicious files detect certain malicious files (in the above described example, the 25,000 malicious files). It may turn out that one malicious file can be detected with the use of one set of models for detection of malicious files, another one with the use of a second set of models for detection of malicious files, a third one with the use of several models for the detection of malicious files from the aforementioned sets of models for the detection of malicious files. The decision making templates are formed on the basis of the data obtained as to which models for detection of malicious files are able to detect which malicious files.

In yet another variant aspect of the system, the analysis module 550 is additionally designed to retrain at least one detection model from the database of detection models 521 on the basis of commands and parameters selected from the behavior log of the file being executed 501 in the case when the degree of similarity between the formed decision making template and at least one of the predetermined decision making templates from the database of decision making templates 541 exceeds a predetermined threshold value, while the degrees of harmfulness calculated with the aid of those models for detection of a malicious file do not exceed a predetermined threshold value.

Figure 6:
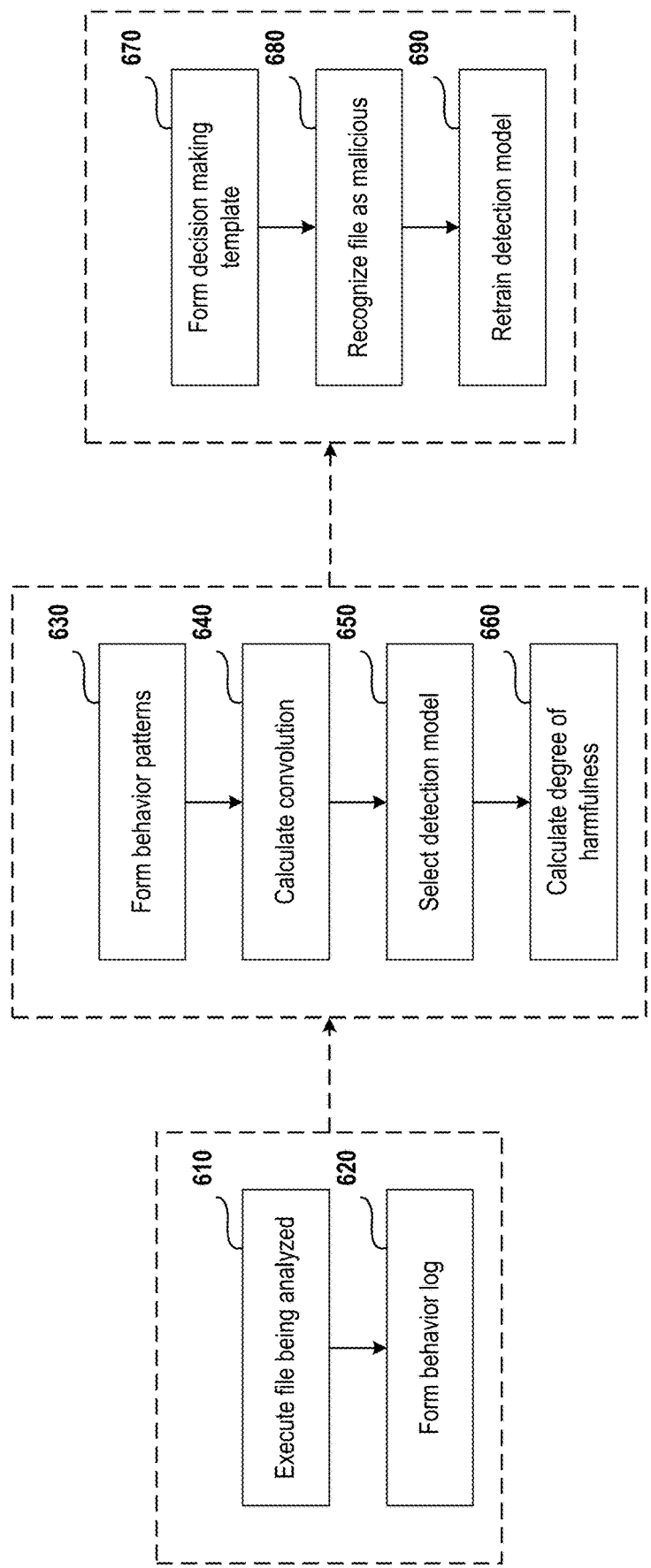
FIG. 6 is a flow diagram of a method for detection of malicious files with the use of a trained model of detection of malicious files, in accordance with exemplary aspects of the present disclosure.

FIG. 6 shows a flow diagram of a method for detection of malicious files with the use of a trained model of detection of malicious files, in accordance with exemplary aspects of the disclosure.

The structural diagram of the method for detection of malicious files with the use of a trained model of detection of malicious files contains a step 610, in which the file being analyzed is executed, a step 620, in which a behavior log is formed, a step 630, in which behavior patterns are formed, a step 640, in which the convolution is calculated, a step 650, in which a detection model is selected, a step 660, in which the degree of harmfulness is calculated, a step 670, in which a decision making template is formed, a step 680, in which the file is recognized as malicious, and a step 690, in which the detection model is retrained.

In step 610, the behavior log forming module 112 is configured to at least:
  execute the file being analyzed 501;
  emulate the execution of the file being analyzed 501.

In step 620, the behavior log forming module 112 forms a behavior log for the file being analyzed 501, for which:
  at least one command being executed is intercepted;
  for each intercepted command at least one parameter is determined describing that command;
  the behavior log of that file 501 is formed on the basis of the intercepted commands and the parameters so determined.

In step 630, the behavior log analysis module 530 is used to form at least one behavior pattern on the basis of the commands and parameters selected from the behavior log of the file being executed 501. The behavior pattern is, in one aspect, a set of at least one command and a parameter which describes all the commands from that set.

In step 640, the behavior log analysis module 530 calculates the convolution of all the behavior patterns formed in step 630.

In step 650, the detection model selection module 520 selects from the database of detection models 521 at least two detection models for malicious files on the basis of the commands and parameters selected from the behavior log of the file being executed 501. The detection model of malicious files is, in one aspect, a decision making rule for determining the degree of harmfulness.

In step 660, the harmfulness module 540 calculates the degree of harmfulness of the file being executed 501 on the basis of an analysis of the convolution calculated in step 640 with the aid of each detection model for malicious files selected in step 650.

In step 670, the analysis module 550 forms a decision making template on the basis of the degrees of harmfulness obtained in step 660.

In step 680, the analysis module 550 recognizes the file being executed 501 as malicious in the event that the degree of similarity between the decision making template formed in step 670 and at least one of the predetermined decision making templates from the database of decision making templates 541 exceeds a predetermined threshold value.

In step 690, the analysis module 550 is used to retrain at least one detection model from the database of detection models 521 on the basis of the commands and parameters selected from the behavior log of the file being executed, in the event that the degree of similarity between the formed decision making template and at least one of the predetermined decision making templates from the database of decision making templates 541 exceeds a predetermined threshold value, while the degrees of harmfulness calculated with the aid of those detection models for a malicious file do not exceed a predetermined threshold value.

Figure 7:
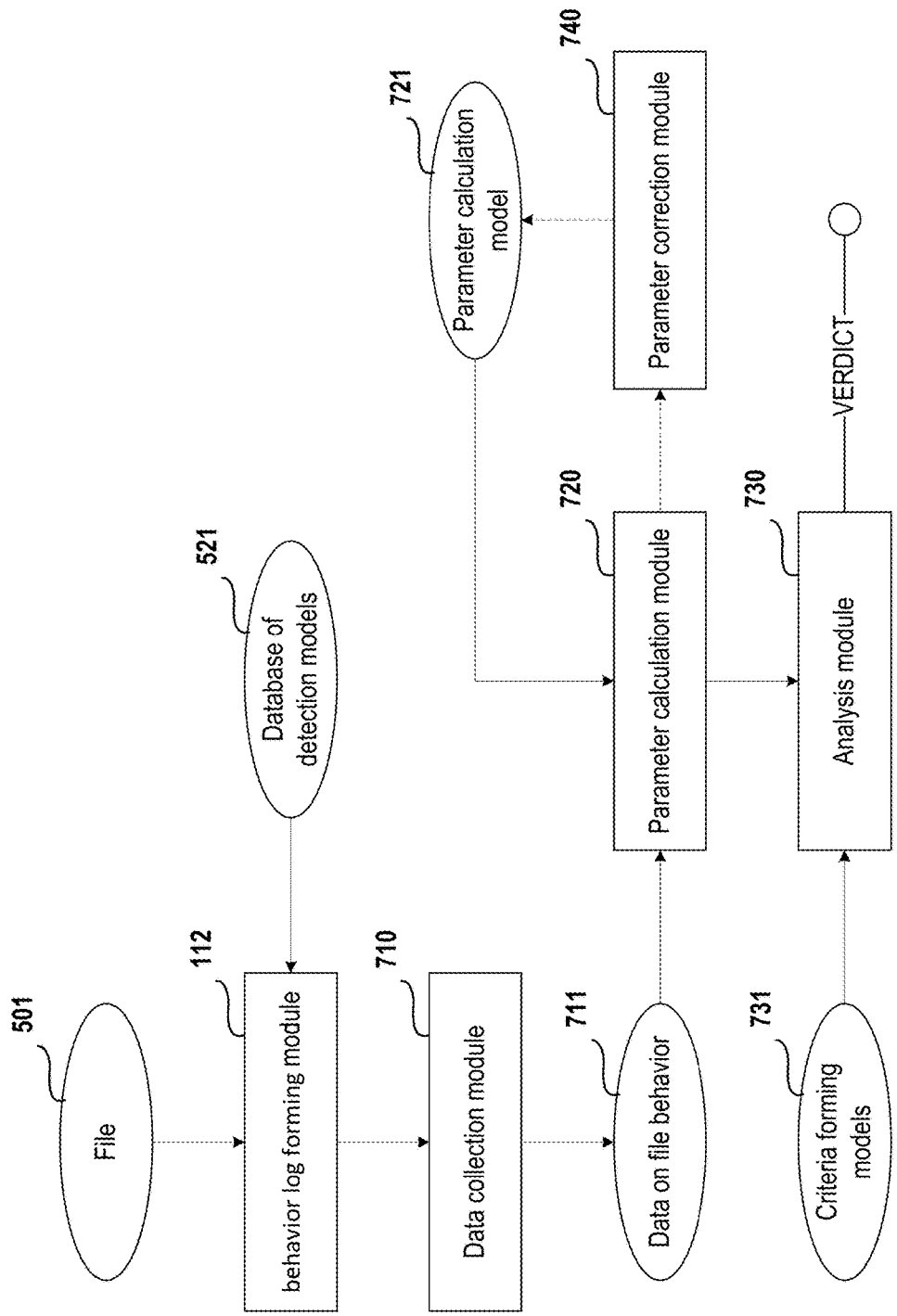
FIG. 7 is a structural diagram of a system for detection of a malicious file, in accordance with exemplary aspects of the present disclosure.

FIG. 7 shows an example of a system for detection of a malicious file, in accordance with exemplary aspects of the present disclosure.

A structural diagram of the system for detection of a malicious file consists of the file being analyzed 501, a behavior log forming module 112, a database of detection models 521, a data collection module 710, data about the behavior of the file 711, a parameter calculating module 720, a parameter calculation model 721, an analysis module 730, a criterion forming model 731, and a parameter correction module 740.

A more detailed description of the behavior log forming module 112, the file 501, the models database 521, and the analysis module 730 (as a variant aspect of the analysis module 550) is disclosed in FIG. 1, FIG. 2, FIG. 5 and FIG. 6.

The data collection module 710 is designed to form, based on data about the execution behavior 711 of the file 501 gathered by the behavior log forming module 112, a vector of features characterizing that behavior, where the vector of features is a convolution of the collected data 711 formed as an aggregate of numbers.

An example of the forming of the convolution of the collected data is presented in the description of the working of the behavior pattern forming module 121 in FIG. 1.

In one variant aspect of the system, the data on the execution behavior 711 of the file 501 includes at least:
  the commands contained in the file being executed 501 or interpretable in the process of execution of the file 501, attributes transmitted to those commands, and the values returned;
  data on the areas of RAM which can be modified during the execution of the file 501;
  the static parameters of the file 501.

For example, the commands may be either instructions (or groups of instructions) of the computer's processor or WinAPI functions or functions from third-party dynamic libraries.

In yet another example, the file 501 may contain unprocessed data (raw data) which is interpreted in the course of execution of the file 501 as processor commands (or commands of a certain process, in the case of "dll" libraries) and/or parameters being transferred to the commands. In a particular case, such data can be portable code.

In yet another example, the data of RAM areas may be:
  the convolutions of those memory areas (for example, with the use of fuzzy hashes);
  the results of lexical analysis of those memory areas, on the basis of which lexemes are extracted from the memory area and statistics are gathered on their use (for example, the frequency of use, the weighting characteristics, relations to other lexemes, and so on);
  static parameters of those memory areas, such as size, owner (process), rights of use, and so forth.

The static parameters of the file 501 are parameters which characterize the file (identify it) and which remain unchanged in the course of the execution, the analysis, or the modification of that file 501, or which characterize the file 501 up to the time of its execution.

In a particular instance, the static parameters of the file 501 may contain information about the characteristics of its execution or behavior (i.e., allowing a prediction of the result of the execution of the file 501).

In yet another example, the static parameters of the file are the size of the file, the time of its creation, modification, the owner of the file, the source from which the file was obtained (electronic or IP address), and so forth.

In yet another variant aspect of the system, data on the execution behavior 711 of the file 501 is gathered from various sources (input data channels), including at least:
  the log of commands executed by the file being analyzed 501;
  the log of commands executed by the operating system or applications being executed under the control of the operating system (except for the file being analyzed 501);
  data obtained through the computer network.

In one aspect, the parameter calculating module 720 calculates, on the basis of the feature vector formed by the data collection module 710 and using the trained parameter calculation model 721, the degree of harmfulness and the limit degree of safety. In exemplary aspects, the degree of harmfulness is a numerical value characterizing the probability that the file 501 may prove to be malicious and the limit degree of safety is a numerical value characterizing the probability that the file 501 will assuredly prove to be malicious when predetermined conditions are met. Depending on the degree of harmfulness and the limit degree of safety (see FIG. 9), the aggregate of said degrees calculated in succession is described by a predetermined time law.

In one variant aspect of the system, for each channel of input data (source of input data or data from a source of output data filtered by a predetermined criterion) there is created a system for extraction of features (a vector of real numbers of length N):
- if the given channel involves the consecutive obtaining of information (for example, a log or sequence of unpacked executable files), then a system is additionally created for aggregation of the features for the input sequence as a single vector;
- a system is created to transform the features from the given channel into a new vector of length K. The values in this vector may only increase monotonically as new elements of the input sequence are processed.

In yet another variant aspect of the system, the system for extraction, aggregation and transforming of features may depend on parameters for teaching, which will be attuned later on in the step of teaching the entire model:
- vectors of length K, arriving from all active channels, are monotonically aggregated into 1 vector of fixed length (for example, the maximum is taken element by element); and/or
- the aggregated monotonically increasing vector is transformed into 1 real number, characterizing the suspiciousness of the process being investigated (for example, the vector is transformed by addition of elements of that vector or by performing actions on the elements of the vector by a predetermined algorithm, such as the calculating of the norm of that vector).

In yet another variant aspect of the system, the parameter calculation model 721 has been previously trained by the method of machine learning on at least one safe file and at least one malicious file.

In yet another variant aspect of the system, the method of machine learning of the parameter calculation model 721 is at least:
- decision tree-based gradient boosting;
- the decision tree method;
- the K-nearest neighbor (kNN) method;
- the support vector machine (SVM) method.

In yet another variant aspect of the system, at least the calculated degree of harmfulness or limit degree of safety depend on the degree of harmfulness and respectively the limit degree of safety calculated at the time of launching of the file 501 on the basis of an analysis of the static data of the file 501.

For example, the degree of harmfulness and the limit degree of safety may be calculated by the formulae:

$$\omega = \omega_0 + \omega(t)$$

$$\varphi = \varphi_0 + \varphi(t)$$

where:
- $\omega$, $\varphi$—are the degree of harmfulness and the limit degree of safety, respectively,
- $\omega_0$, $\varphi_0$—are the starting values of the degree of harmfulness and the limit degree of safety not depending on the execution parameters of the file 501, yet depending on external conditions (the working parameters of the operating system and so forth),
- $\omega(t)$, $\varphi(t)$—are the time laws used to calculate the degree of harmfulness and the limit degree of safety, respectively.

Said time laws may be dependent on each other, i.e., on the previously calculated degree of harmfulness and limit degree of safety:

$$\omega(t_n) = \omega(t, \varphi(t_{n-1}))$$

$$\varphi(t_n) = \varphi(t, \omega(t_{n-1}))$$

Figure 9:
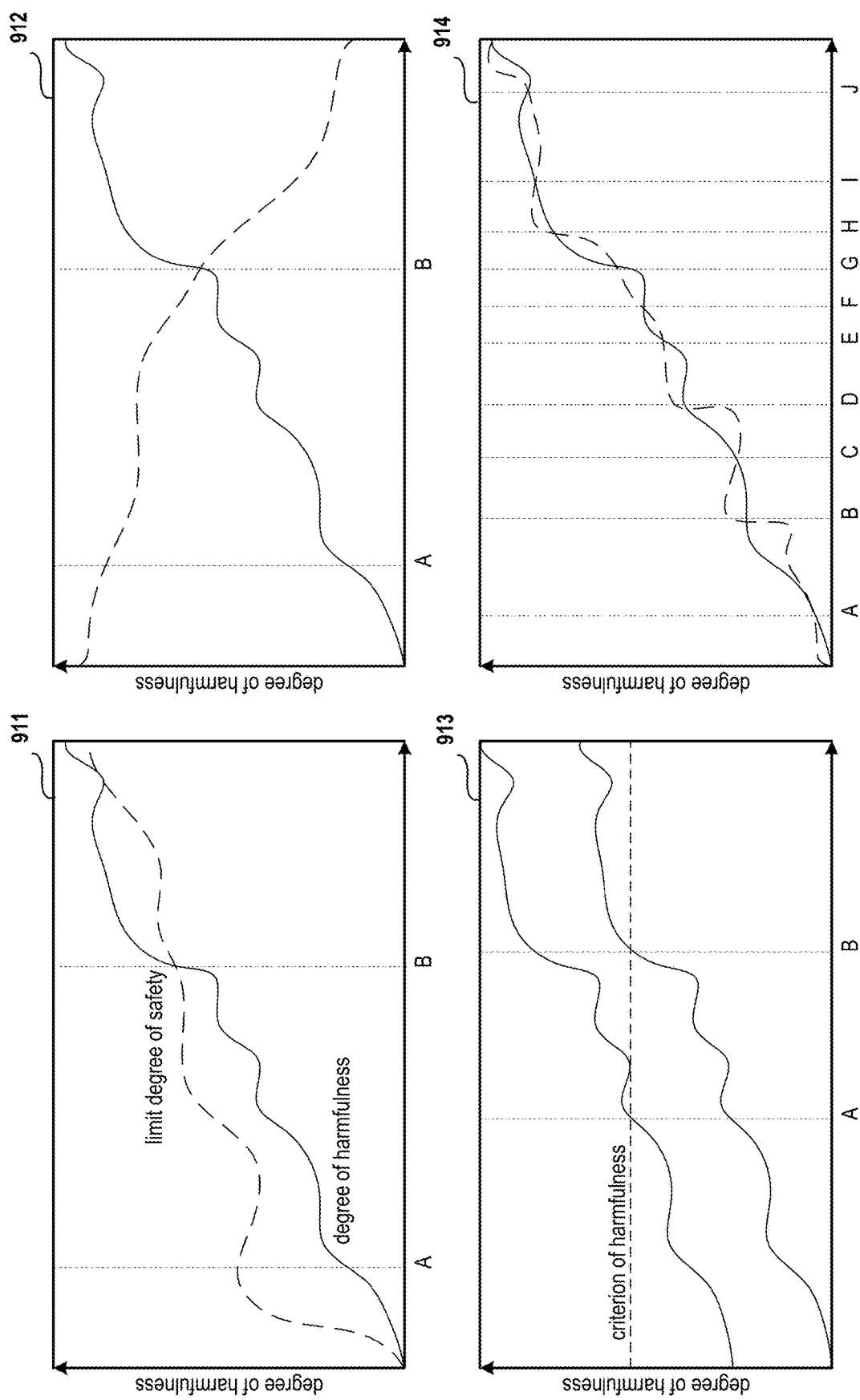
FIG. 9 shows examples of the dynamics of change in the degree of harmfulness and the limit degree of security as a function of the number of behavior patterns, in accordance with exemplary aspects of the present disclosure.

The above variant aspect of the system is disclosed in more detail in FIG. 9.

In yet another variant aspect of the system, the trained parameter calculation model 721 is an aggregate of rules for calculating the degree of harmfulness of a file and the limit degree of safety of a file dependent on the data determined about the execution behavior 711 of the file 501.

In yet another variant aspect of the system, the time laws describing the aggregate of consecutively calculated degrees of harmfulness and the aggregate of consecutively calculated limit degrees of safety are monotonic in nature.

For example, the curve of the change in the degree of harmfulness as a function of time may be described by a monotonically increasing function (such as $f(x)=ax+b$).

In yet another variant aspect of the system, the time laws describing the aggregate of consecutively calculated degrees of harmfulness and the aggregate of consecutively calculated limit degrees of safety have a piecewise monotonic nature, i.e., they have a monotonic nature for specified time intervals.

Often during operation of the system being described, it is not possible (due to limitations on the computing resources, the computer time, the presence of demands on minimal performance, etc.) to determine constantly (continuously or with a given periodicity) the degree of harmfulness. Therefore the degree of harmfulness and the limit degree of safety may be calculated over calculable intervals of time (not predetermined ones, but intervals which can be calculated in the process of execution of the file 501). Such calculations are also based on certain predetermined time laws, for which the input parameters are calculated in the process of execution of the file, i.e., one may write for the time of calculation of the file:

$$t_n = T(t_{n-1})$$

The time of calculation of the degree of harmfulness and the limit degree of safety may depend on the previously calculated degree of harmfulness and limit degree of safety:

$$t_n = \tau(t_{n-1}, \omega(t_{n-1}), \varphi(t_{n-1}))$$

For example, when the file 501 is launched, for the first 10 seconds the degree of harmfulness of that file increases monotonically, after the 10th second, the degree of harmfulness of that file is halved, and then it begins to increase monotonically once again.

The analysis module 730 pronounces a decision on the detection of a malicious file 501 in the event that the data collected on the execution behavior 711 of the file 501 meets a predetermined criterion for the finding of harmfulness. The criterion is formulated on the basis of the degree of harmfulness and the limit degree of safety as calculated by the parameter calculating module 720. In one aspect, the criterion is a rule for the classification of the file (provided by the criterion forming model 731) in terms of an established correlation between the degree of harmfulness and the limit degree of safety.

In one variant aspect of the system, the correlation between the degree of harmfulness and the limit degree of safety is at least:
- the difference from a predetermined threshold value of the distance between the degree of harmfulness and the boundary conditions of harmfulness;
- the difference from a predetermined threshold value of the areas bounded in a given time interval between curves describing the degree of harmfulness and the limit degree of safety;
- the difference from a predetermined threshold value of the rates of mutual increase of the curve describing the change in the degree of harmfulness and the boundary conditions of harmfulness as a function of time.

For example, the most characteristic instances of the described correlation are depicted in FIG. 9.

The parameter correction module 740 is designed to retrain the parameter calculation model 721 on the basis of an analysis (see FIG. 9) of the calculated degree of harmfulness and limit degree of safety. Once the model 721 is retrained, changes in the time laws describing the degree of harmfulness and the limit degree of safety cause the correlation between the values obtained with the use of those time laws to tend toward a maximum.

In one variant aspect of the system, the parameter calculation model 721 is retrained such that, when the model is used, the criterion formed afterwards ensures at least:
- that the accuracy of determining the degree of harmfulness and the limit degree of safety is greater than when using an untrained model for calculation of parameters;
- the utilization of the computing resources is lower than when using an untrained model for calculation of parameters.

For example, after the retraining (or further training), the correlation factor between the values of the curves of the degree of harmfulness and the limit degree of safety becomes larger (tends toward 1).

As a result, under constant retraining of the parameter calculation model 721 the probability of occurrence of errors of the first and second kind (false positives) constantly diminishes. The use of the different retraining criteria presented above ensures that the system for detection of a malicious file with a retrained model 721 has a very high rate of decrease in the errors of the first and second kind at the start (in the initial stages of the retraining), so that with few retraining iterations of the parameter calculation model 721 the effectiveness of the system for detection of a malicious file rises sharply, tending toward 100%.

Figure 8:
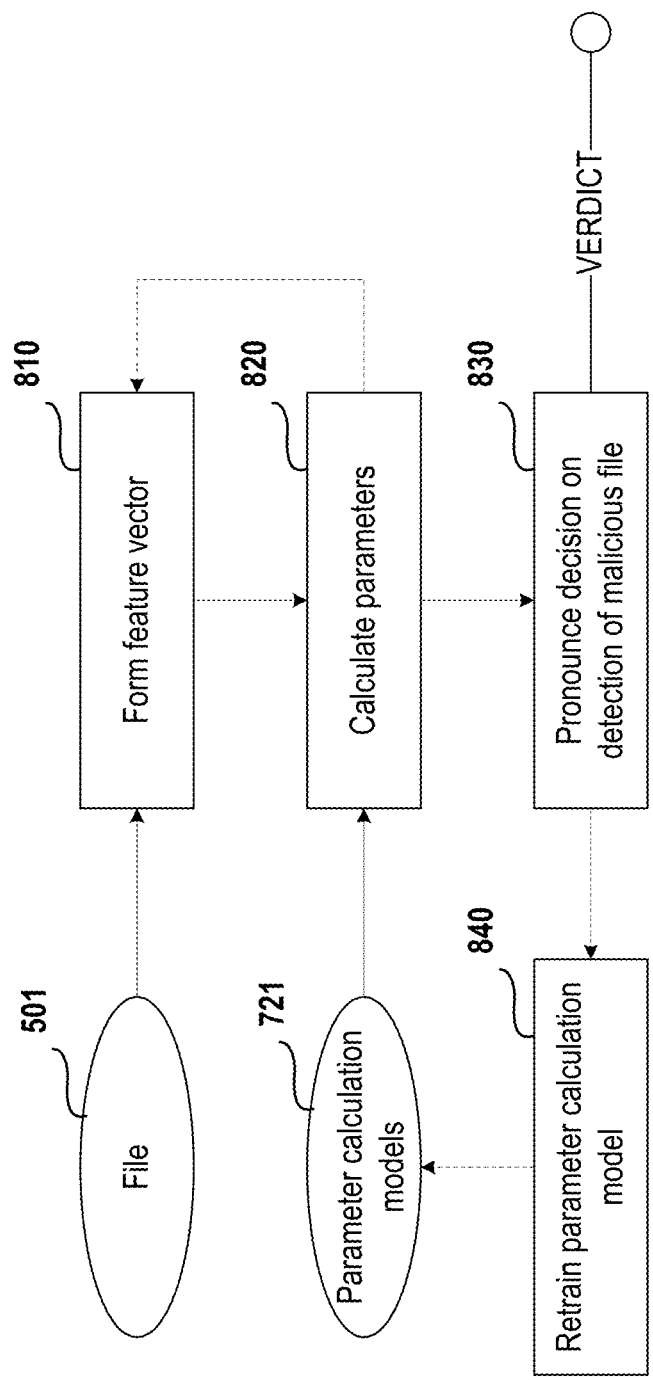
FIG. 8 is a flow diagram of a method for detection of a malicious file, in accordance with exemplary aspects of the present disclosure.

FIG. 8 shows an example of a method for detection of a malicious file, in accordance with exemplary aspects of the present disclosure.

A structural diagram of the method for detection of a malicious file contains a step 810, in which a feature vector is formed, a step 820, in which parameters are calculated, a step 830, in which a decision is pronounced as to the detection of a malicious file, and a step 840, in which the parameter calculation model.

In step 810, a vector of the features characterizing the execution behavior 711 of the file 501 is formed on the basis of the data gathered about said behavior, the feature vector being a convolution of the gathered data in the form of an aggregate of numbers.

In step 820, there are calculated, on the basis of the feature vector so formed and using the trained parameter calculation model 721, the degree of harmfulness, which is a numerical value characterizing the probability that the file 501 may prove to be malicious, and the limit degree of safety, which is a numerical value characterizing the probability that the file 501 will assuredly prove to be malicious when the aggregate of said consecutively calculated degrees are described by a predetermined time law.

Steps 810-820 are carried out for different consecutive time intervals of execution of the file being analyzed 501, in accordance with exemplary aspects of the disclosure.

In step 830, a decision is pronounced as to the detection of a malicious file 501 in the event that the data gathered on the execution behavior 711 of the file 501 satisfy a predetermined criterion for a finding of harmfulness (see FIG. 9), formulated on the basis of the degree of harmfulness and the limit degree of safety as calculated in step 820, said criterion being a rule for classification of the file in terms of an established correlation between the degree of harmfulness and the limit degree of safety.

In step 840, the parameter calculation model 721 is additionally retrained on the basis of an analysis of the calculated degree of harmfulness and limit degree of safety, as a result of which changes in the time laws describing the degree of harmfulness and the limit degree of safety result in the correlation between the values obtained with those laws tending toward a maximum.

FIG. 9 shows examples of the dynamics of change in the degree of harmfulness and the limit degree of safety as a function of the number of behavior patterns:

In diagram 911 a situation is illustrated in which an increase in the degree of harmfulness of the file being analyzed 501 is observed over time (essentially with increasing of the number of behavior patterns formulated). An increase is likewise observed in the limit degree of safety (the general case of the criterion of harmfulness shown in FIG. 3).

A decision as to the detection of a malicious file 501 is made if the degree of the malicious file 501 begins to exceed the limit degree of safety of the file 501 (point 911.B).

Such a situation is observed in the event that "suspicious" activity is registered both during the execution of the file 501 and upon analysis of the condition of the operating system as a whole. Thus, a decrease in the probability of occurrence of an error of the first kind is achieved. Even though suspicious activity is registered in the working of the system (i.e., activity not yet able to be considered malicious, yet also not yet able to be considered safe, for example, archive packing with subsequent deletion of the initial files), that activity is considered when calculating the degree of harmfulness of the file 501, such that the pronouncing of a positive verdict as to the detection of a malicious file is not based for the most part on the suspicious activity in the working of the system, rather than that during the execution of the file 501, i.e., the contribution of the execution activity of the file 501 to the final decision on recognizing the file 501 as malicious should be greater than the contribution of the system activity.

For example, a similar situation may be observed when a user performs an archiving of data on the computer, resulting in a repeated reading of data from the hard disk and subsequent renaming or deletion of files, which might be considered suspicious activity of the working of malicious encryption software for the system of an ordinary user (such as an office worker), since such activity (based on statistical data obtained from users) is observed very seldom if at all for those users.

For example, a standard antivirus application during the analysis of the activity of software on a user's computer may issue warnings (not undertaking any active measures) that a particular application is behaving "suspiciously", i.e., the behavior of that application does not conform to predetermined rules of the antivirus application. But the proposed system does not operate by predetermined rules, but instead dynamically assesses the change in activity, resulting in the detection (pronouncing as malicious) of a malicious, but unknown file 501.

In yet another example, the change in activity upon execution of a file 501 may be a consequence of the transmission of data in a computer network, depending on the characteristics of the data being transmitted (frequency, quantity, and so forth), which may indicate that malicious activity is taking place (for example, a malicious program of remote administration (backdoor) is running). The longer such activity goes on, the higher the chance of it being recognized as malicious, since it differs noticeably from typical network activity on the user's computer.

In diagram 912 a situation is depicted in which an increase in the degree of harmfulness of the file being analyzed 501 and a decrease in the limit degree of safety is observed over time.

The decision as to the detection of a malicious file 501 is made if the degree of the malicious file 501 begins to exceed the limit degree of safety of the file 501 (point 912.B).

Such a situation is observed in the event, which is the converse of that described in diagram 911, that no "suspicious" activity is observed during the analysis of the condition of the operating system. Thus, a decrease is achieved in the probability of occurrence of an error of the second kind (overlooking a malicious file). Suspicious activity influences "more strongly" the pronouncing of an affirmative verdict as to the detection of a malicious file if the rest of the behavior during the execution of the file in particular or the operating system as a whole does not look "suspicious".

For example, such a situation may be observed during operation of malicious programs of remote administration on the user's computer. The malicious activity appears only episodically, e.g. every subsequent episode may be analyzed more "closely". In other words, the criterion after which the activity will be considered malicious should decrease constantly. But in the event that trusted applications begin being executed on the user's computer, whose behavior could be considered suspicious, yet is not considered such on account of the applications being trusted (i.e., previously checked for harmfulness), the limit degree of harmfulness may be increased. This will protect against recognizing the behavior of legitimate files as malicious and merely postpone the detecting of malicious behavior of a malicious file.

Diagram 913 depicts a situation in which it is observed that the degree of harmfulness of the analyzed file 501 increases over time. The increase does not start from the zero mark, but rather from a certain calculated value, so that the criterion of harmfulness will be reached sooner than in the initial case, or it will be reached whereas it would not have been reached in the initial case.

The decision on the detection of a malicious file 501 is pronounced if the difference between the degree of the malicious file 501 and the limit degree of safety of the file 501 becomes less than a predetermined threshold value (point 913.B). In a particular instance, such a decision can be made only if the difference between the degree of the malicious file 501 and the limit degree of safety of the file 501 became less than another predetermined threshold value (point 913.A) (and this difference between points 913A and 913B may have increased).

For example, during the execution of a file 501 obtained from an unknown source or formed on the computer by "suspicious" methods (such as a writing of data from the memory of a process to disk), the degree of harmfulness may initially reveal itself to be higher than the degree of harmfulness of files obtained by less "suspicious" methods.

In the diagram 914 a situation is illustrated which is analogous to the situation depicted in diagram 911, with the only difference being that the curves describing the degree of harmfulness and the limit degree of safety have several successive points of intersection. In such a situation, the decision to recognize the file 501 as malicious will be made not by the fact of the intersecting of these curves, but by the number of intersections exceeding a predetermined threshold value or by the area cut out by these curves exceeding a predetermined threshold value.

These diagrams will increase the effectiveness of detection of malicious files and reduce the errors of the first and second kind in the detecting of malicious files 501.

The description of the correlation between the calculated degree of harmfulness and the calculated limit degree of safety and the decision on pronouncing the file 501 as malicious can be expressed in the following mathematical or algorithmic form:

$$\omega(t) > \varphi(t)$$

$$\sum_n (\omega(t_n) > \varphi(t_n))^2 > \varepsilon$$

Figure 10:
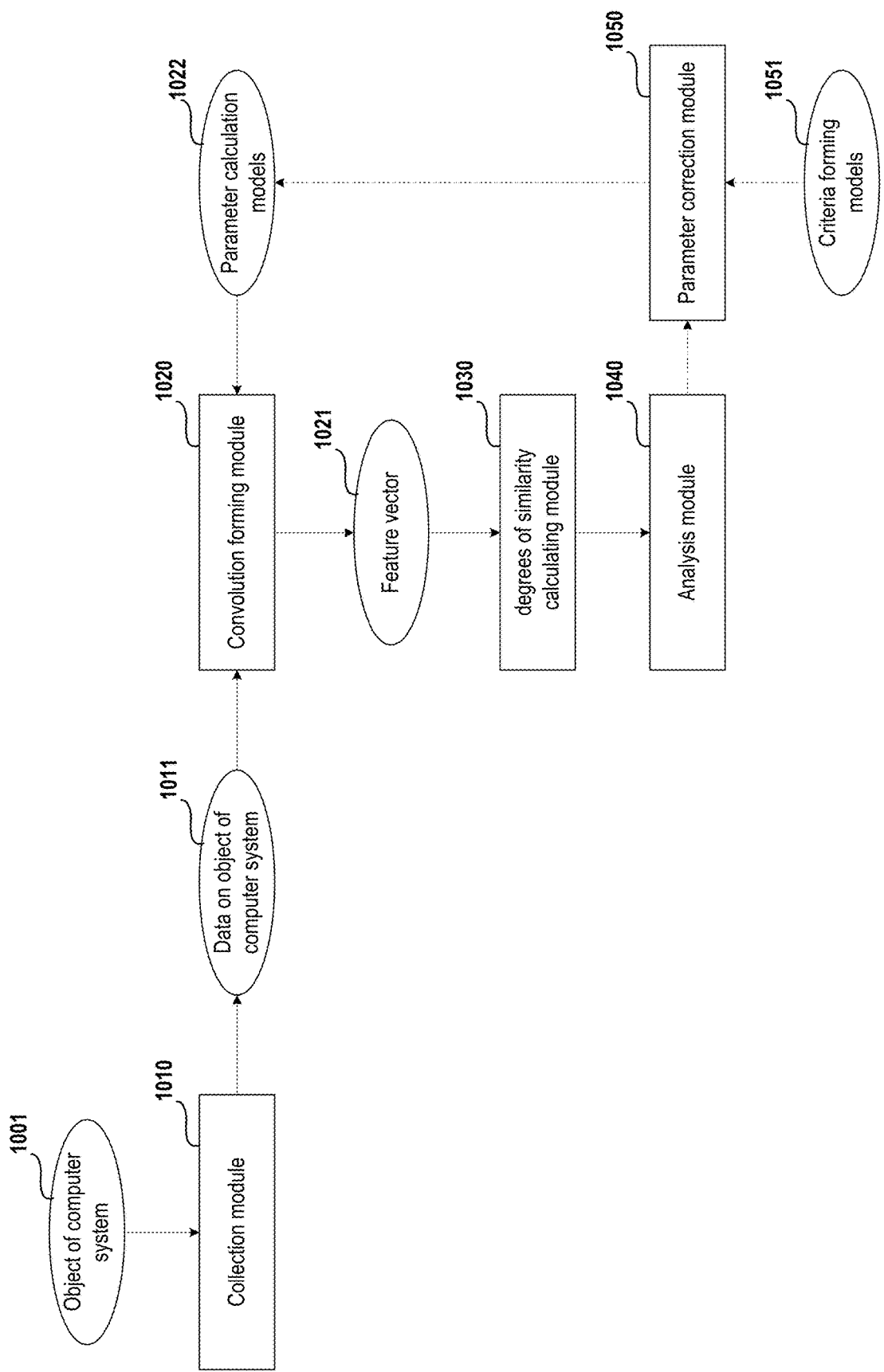
FIG. 10 is a structural diagram of a system for classification of objects of a computer system, in accordance with exemplary aspects of the present disclosure.

FIG. 10 shows a structural diagram of a system for classification of objects of a computer system, according to exemplary aspects of the disclosure.

The structural diagram of the system for classification of objects of a computer system consists of an object of the computer system 1001, a gathering module 1010, data about the object of the computer system 1011, a convolution forming module 1020, a feature vector 1021, a degree of similarity calculating module 1030, a model for calculation of parameters 1031, an analysis module 1040, a parameter correction module 1050 and a model for formation of criteria 1051.

The gathering module 1010 is designed to gather data 1011 describing the object of the computer system 1001 (hereinafter, the object).

In one variant aspect of the system, the computer systems are at least:
personal computers,
notebooks,
tablets,
smartphones,
controllers,
servers,
data storage means.

In yet another variant aspect of the system, the objects of the computer system 1001 are at least:
files,
processes,
threads, synchronization objects,
applications,
archives (files containing other files),
database records.

In yet another variant aspect of the system, the data describing the object 1001 is at least:
data identifying the object 1001 (such as a file name or hash computed from the file),
data describing the logical and functional relations between that object 1001 and other objects 1001 (for example, which files are contained in an archive, which threads are generated in relation to it, and so forth),
data describing the difference of that object 1001 from other objects 1001 (such as file size, type of executable file, method of using the object, and so forth),
the type of the object 1001.

The data describing the object 1001 (or parameters characterizing the object 1001) are described in further detail in FIG. 1, FIG. 2, and FIG. 5 to FIG. 8.

For example, the computer system may be the personal computer of a user, and the objects of the computer system 1001 may be files. The classification of the files of that personal computer consists in determining which files are malicious, and which files are safe (an antivirus scan is performed).

In yet another variant aspect, the data describing the object 1001 is gathered and analyzed in accordance with conditions established by specified rules of gathering. As a result, before the analysis is performed by the analysis module 1040, data may be gathered on several (often differing) states of the object 1001. This, in turn, results in increased accuracy of the classification of the object 1001 and fewer errors of the first and second kind, which may arise during said classification.

In yet another variant aspect of the system, the analysis of the data on the object 1001 may be done in parallel with the gathering of the data on the object 1001, and thus two analysis results may be based on common data to a certain degree. This, in turn, results in increased accuracy of the classification of the object 1001 and fewer errors of the first and second kind, which may arise during said classification, and also increased speed of performance of the classification and less use of computer resources during such a classification.

In yet another variant aspect of the system, the state of the object 1001 is a set of parameters and attributes (which can be identified from the gathered data characterizing the object 1001) at least:
clearly identifying the object 1001 among other objects,
clearly identifying a group of objects 1001 having identical or similar parameters or attributes;
distinguishing the object 1001 from other objects with a given degree of similarity.

In yet another variant aspect of the system, the gathering rule is at least:
the interval of time between different states of the object 1001 satisfies a given value;
the interval of change in a parameter describing the state of the object 1001 satisfies a given value;
the interval of change in a parameter of the computer system resulting in a change in state of the object 1001 satisfies a given value.

Instead of a change in state of the system in time (as stated in item 1 above), it is possible to use a change in state of the system allowing for the dynamics of change of a second selected parameter of the object 1001 or the computer system. In this case, the object 1001 is analyzed in a monomerous space, where the specified parameters are independent quantities (the bases of that space), and time is a quantity dependent on those parameters.

For example, the states of the objects 1001 are determined every 100 ms (i.e., the interval of time between two states of the object 1001 is 100 ms).

In yet another example, the states of the objects 1001 are determined after a change occurs in the size of those objects (or the volume of data contained in the object 1001) by 1 kB (i.e., the parameter describing the state of the object 1001 changes).

In yet another example, the states of the objects 1001 are determined after a change occurs in the volume of memory or data storage means used (for example, a hard disk) by 1 MB (i.e., a parameter of the computer system changes).

In yet another variant aspect of the system, the gathering of data 1011 about the object 1001 is done by intercepting data 1011 (about the object 1001 or that being transmitted to the object 1001 or from the object 1001) on the computer device with the aid of a driver or other software embedded in the computer device.

For example, in order to obtain data about files 1001 on a personal computer, a driver is used which intercepts calls for WinAPI functions from applications for working with those files 1001.

The convolution forming module 1020 forms, on the basis of the data about the state of the object 1001 gathered by the gathering module 1010, a feature vector 1021 characterizing the state of the object 1001.

In one variant aspect of the system, the feature vector 1021 represents a convolution of collected data 1011 organized in the form of a set of numbers.

The formation of the feature vector 1021 is described in further detail in FIG. 1 and FIG. 2.

In yet another variant aspect of the system, the feature vector 1021 contains at least one hash sum, calculated at least from the gathered data 1011:
of given type (for example, the hash sum is calculated only from data characterizing events related to the object 1001);
of given value range (for example, the hash sum is calculated only from files with a size between 4096 kB and 10240 kB).

For example, all of the data gathered about an object 1001 which is an installation package containing other files (which will be on the computer of the user) and installation instructions (scripts, etc.) can be divided into 2 categories: executable files and scripts and auxiliary data. For the executable files, the hash sum MD5 is calculated; for the scripts, CRC32; and the number of those objects in each class is also counted. The summary hash sum is an aggregate of the computed hash sums and the counted number of objects.

In yet another variant aspect of the system, the model for calculation of parameters 1022 was previously trained by the method of machine learning on at least two objects 1001 belonging to different classes.

In yet another variant aspect of the system, the method of machine learning of the model for calculation of parameters 1022 is at least:
decision tree-based gradient boosting;
the decision tree method;
the K-nearest neighbor (kNN) method;
the support vector machine (SVM) method.

In yet another variant aspect of the system, the trained model for calculation of parameters 1022 is an aggregate of rules for calculating the degree of similarity of the object

1001 and the limit degree of difference of the object 1001, depending on the data determined for the dynamics of change in the state of the object 1001.

In yet another variant aspect of the system, the classes of the objects of the computer system 1001 are at least the following classes:
  safety of the objects of the computer system:
  malicious object of the computer system;
  suspicious object of the computer system;
  safe object of the computer system;
  priority of use of objects of the computer system (i.e., which object of the computer system is to be used earlier, and how much earlier, or which computing resources, such as memory, are to be allocated to which object of the computer system);
  performance of the objects of the computer system.

For example, when analyzing the files 1001 on the personal computer of a user an antivirus scan is performed, the purpose of which is a classification of all files 1001 being analyzed into two groups: malicious files and safe files. Each file in these classes can be matched up with a certain degree of similarity (i.e., the probability that the file 1001 should belong to one of the stated classes). Such an example is described more closely in FIG. 1 to FIG. 9.

In yet another example, the classes might not be various separate entities (as in the example given above), but a single entity, yet in different ranges, such as: the priority of allocation of computing resources (RAM) of the objects of the computer system can be assessed numerically from 0% to 100% and can form 4 classes—1: from 0% to 25%, 2: from 26% to 50%, 3: from 51% to 75%, 4: from 76% to 100%. In the given example, there is an allocating of RAM from the pool of 1 GB among the objects of the computer system; objects with minimal priority (0%) are allocated 1 MB of RAM, objects with maximum priority (100% are allocated 100 MB, and the other objects are allocated corresponding proportions.

The degree of similarity calculating module 1030 calculates, on the basis of the feature vector 1021 formed by the convolution forming module 1020 and using a trained model for calculation of parameters, the degree of similarity 1022, representing a numerical value characterizing the probability that the object 1001 being classified may belong to a given class, and the limit degree of difference, representing a numerical value characterizing the probability that the object 1001 being classified will certainly belong to another specified class. This degree of similarity and this limit degree of difference are independent characteristics describing the object 1001 stemming from different approaches to the classification of objects. The advantage of such an approach is that each method of classification (or method of comparison) has its own accuracy and there always exists a probability of occurrence of errors of the first and second kind. When several independent methods are used, that probability is reduced in accordance with the laws of probability theory. Depending on the methods chosen (how much the degrees of similarity or difference obtained by using them are correlated with each other), the combined probability of occurrence of errors of the first and second kind will change (decrease). Thus, knowing the criteria of "stability" of the system, i.e., knowing the maximum level of errors acceptable for the working of the system (in the present case, for the classification), one can select corresponding methods for obtaining the degrees of similarity or difference.

In one variant aspect of the system, if in the course of the period defined by the specified rule of collection at least two degrees of similarity and limit degrees of difference have been calculated, the aggregate of consecutively calculated degrees of similarity and limit degrees of difference is described by a predetermined time law.

In yet another variant aspect of the system, several degrees of similarity and limit degrees of difference are calculated for one object 1001, on the basis of data on at least two states of that object 1001.

In yet another variant aspect of the system, the data on the state of the object 1001 includes at least:
  the actions being executed on the object 1001 by the computer system;
  the actions being executed by the object 1001 on the computer system;
  the parameters of the computer system whose change results in a change in the state of the object 1001;
  static parameters of the object 1001 (parameters of the object 1001 not changed upon a change in the state of the object 1001, such as the size of a file kept in an archive or the name of an executable file).

For example, if the object 1001 is an executable file, the commands being executed by that executable file on the operating system may be calls for WinAPI functions.

In yet another example, if the object 1001 is a record in a database, the command executed by the means of working with databases on that record may be SQL query commands.

In yet another variant aspect of the system, at least the degree of similarity or the limit degree of difference being calculated depend on the degree of similarity and accordingly the limit degree of difference calculated at least:
  at the instant of creating the object 1001;
  at the instant of the first change in state of the object 1001;
  on the basis of an analysis of the static parameters of the object 1001.

For example, if at the start of the execution of a file the degree of similarity to the class of malicious objects for the file is 0.0, but as time passes it rises to 0.4, the degree of similarity to a malicious object for the file created by that file is designated as 0.4 already at the instant of its creation, and it increases in the process of its working. This process is described in further detail in FIG. 7 to FIG. 9.

In yet another variant aspect of the system, the time laws describing the aggregate of consecutively calculated degrees of similarity and the aggregate of the consecutively calculated limit degrees of difference are monotonic in nature.

For example, the change in the degree of similarity (or the degree of harmfulness, in an analysis of a file for harmfulness) of the file 1001 being analyzed can only increase, while the limit degree of difference (the limit degree of safety in an analysis of a file for harmfulness) can only decrease. Thus, sooner or later the analyzed file will be recognized as malicious, once the sum total of its "suspicious actions" exceeds the established limit.

In yet another variant aspect of the system, the degree of similarity is determined at least:
  using the Hirchberg algorithm;
  by the Damerau-Levenshtein distance;
  by the Jensen-Shannon distance;
  by the Hamming distance;
  using the Jaro-Winkler similarity algorithm.

For example, the above indicated methods of determining the degree of similarity may be used depending on which objects 1001 are being analyzed. If the objects 1001 are text files, one will use the Hirchberg algorithm, if they are lexemes, the Hamming distance.

The analysis module 1040 is designed to pronounce a decision as to whether the object 1001 belongs to a given class, in the event that the data on the state of the object 1001 gathered up to the time of actuation of the given gathering rule satisfies the given criterion for determining the class. The criteria is formulated on the basis of the degree of similarity and the limit degree of difference as calculated by the degree of similarity calculating module 1030. The criterion is the rule for classification of the object by the correlation established between the degree of similarity and the limit degree of difference.

In one variant aspect of the system, the analysis module 1040 begins working after data characterizing the object 1001 has been gathered and processed with the aid of the gathering module 1010, the convolution forming module 1020 and the degree of similarity calculating module 1030. This fact is determined with the aid of the data gathering rule (i.e., the rule of when to halt the gathering of data on the object 1001 and commence the analysis of that data).

The analysis is described in further detail in FIG. 7 to FIG. 9.

In one variant aspect of the system, the correlation between the degree of similarity and the limit degree of difference is at least:
- the difference from a predetermined threshold value of the distance between the degree of similarity and the limit degree of difference;
- the difference from a predetermined threshold value of the area bounded in a given time interval between the degree of similarity and the limit degree of difference;
- the difference from a predetermined threshold value of the rate of mutual growth of the curve describing the change in the degree of harmfulness and the limit degree of difference.

The correlations are described in further detail in FIG. 7 to FIG. 9.

The parameter correction module 1050 is designed to retrain the model for calculation of parameters 1022 on the basis of an analysis of the calculated degree of similarity and the calculated limit degree of difference, as a result of which changes in the time laws describing the degree of similarity and the limit degree of difference will result in the correlation between the values obtained on the basis of those laws tending toward a maximum.

In one variant aspect of the system, the model for calculation of parameters 1022 is retrained so that, when that model 1022 is used, a criterion formed afterwards will ensure at least:
- that the accuracy of determining the degree of similarity and the limit degree of difference is greater than when using an untrained model for calculation of parameters 1022;
- the utilization of the computing resources is lower than when using an untrained model for calculation of parameters.

The technology for the machine learning is described in further detail in FIG. 1, FIG. 2, FIG. 5, and FIG. 6. Even though the teaching of the model for calculation of parameters 1022 has been described above for the classification of objects of a computer system 1001, while the figures show models for detection of malicious files, these technologies are algorithmically similar, and the detection of malicious files is a particular instance of the model for calculation of parameters, since in this case there is a classification of files by two classes: "safe files" and "malicious files".

Figure 11:
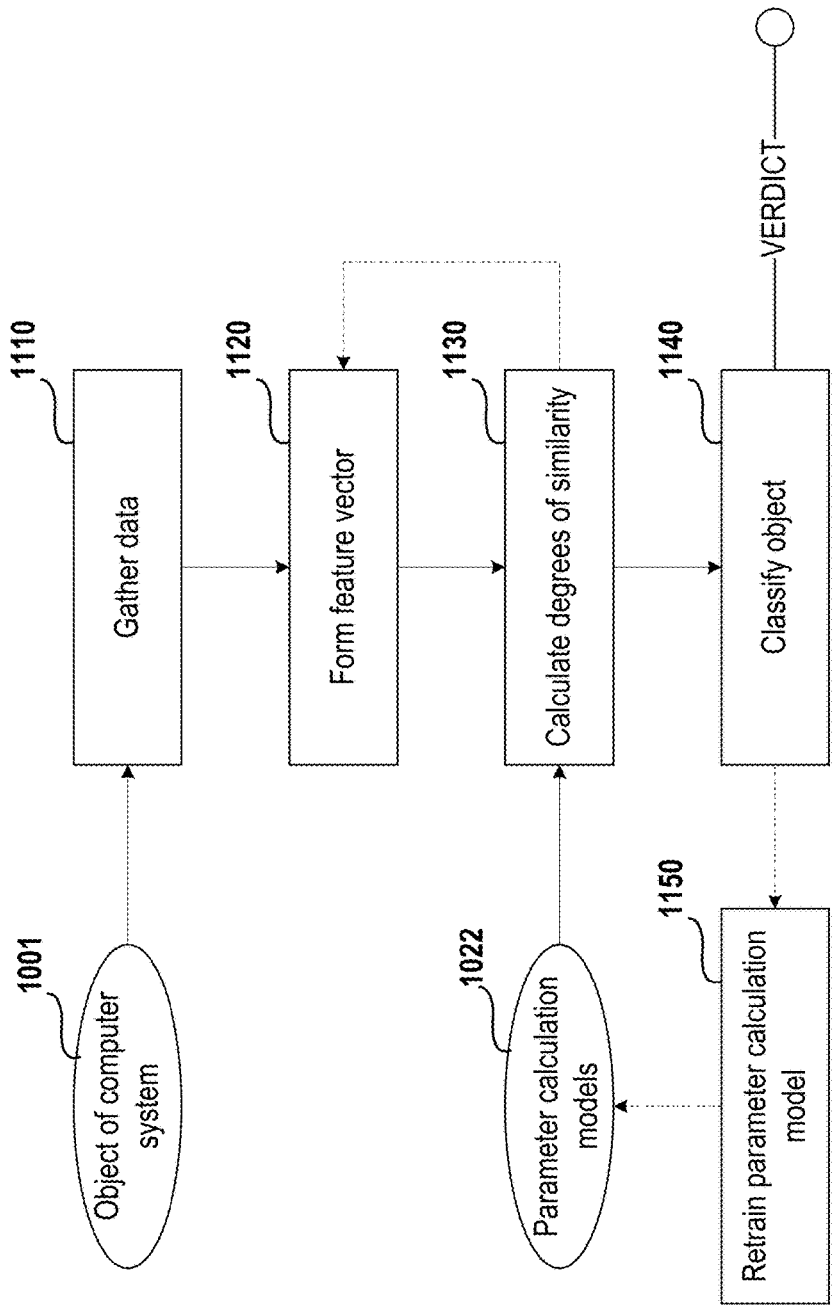
FIG. 11 is a flow diagram of a method for classification of objects of a computer system, in accordance with exemplary aspects of the present disclosure.

FIG. 11 shows a structural diagram of a method for classification of objects of a computer system.

The structural diagram of the method for classification of objects of a computer system contains a step 1110 in which data is gathered about an object of the computer system, a step 1120 in which a feature vector is formed, a step 1130 in which degrees of similarity are calculated, a step 1140 in which the object of the computer system is classified, and a step 1150 in which a model for calculation of parameters is retrained.

In step 1110 data 1011 describing the state of the object of the computer system 1001 (hereafter, the object) is gathered.

In step 1120, on the basis of the data 1011 gathered about the states of the object 1001, a feature vector 1021 is formed, characterizing the state of the object 1001.

In step 1130, on the basis of the feature vector 1021 formed and using a trained model for calculation of parameters 1022, there is calculated a degree of similarity, representing a numerical value characterizing the probability that the object 1001 being classified may belong to a given class, and a limit degree of difference, representing a numerical value characterizing the probability that the object 1001 being classified will certainly belong to another specified class.

In step 1140, a decision is pronounced that the object 1001 belongs to the specified class if the data 1011 on the state of the object 1001 that was collected during a period of time as defined by a specified rule for the collection in steps 1110-1130 satisfies a specified criterion for determination of the class, formed on the basis of the degree of similarity and the limit degree of difference calculated in the previous step, said criterion being a rule for the classification of the object 1001 according to an established correlation between the degree of similarity and the limit degree of difference.

In step 1150 the model for calculation of parameters 1022 is retrained on the basis of the analysis of the calculated degree of similarity and the calculated limit degree of difference, as a result of which changes in the time laws describing the degree of similarity and the limit degree of difference will cause the correlation between the values obtained on the basis of those laws to tend toward a maximum.

Figure 12:
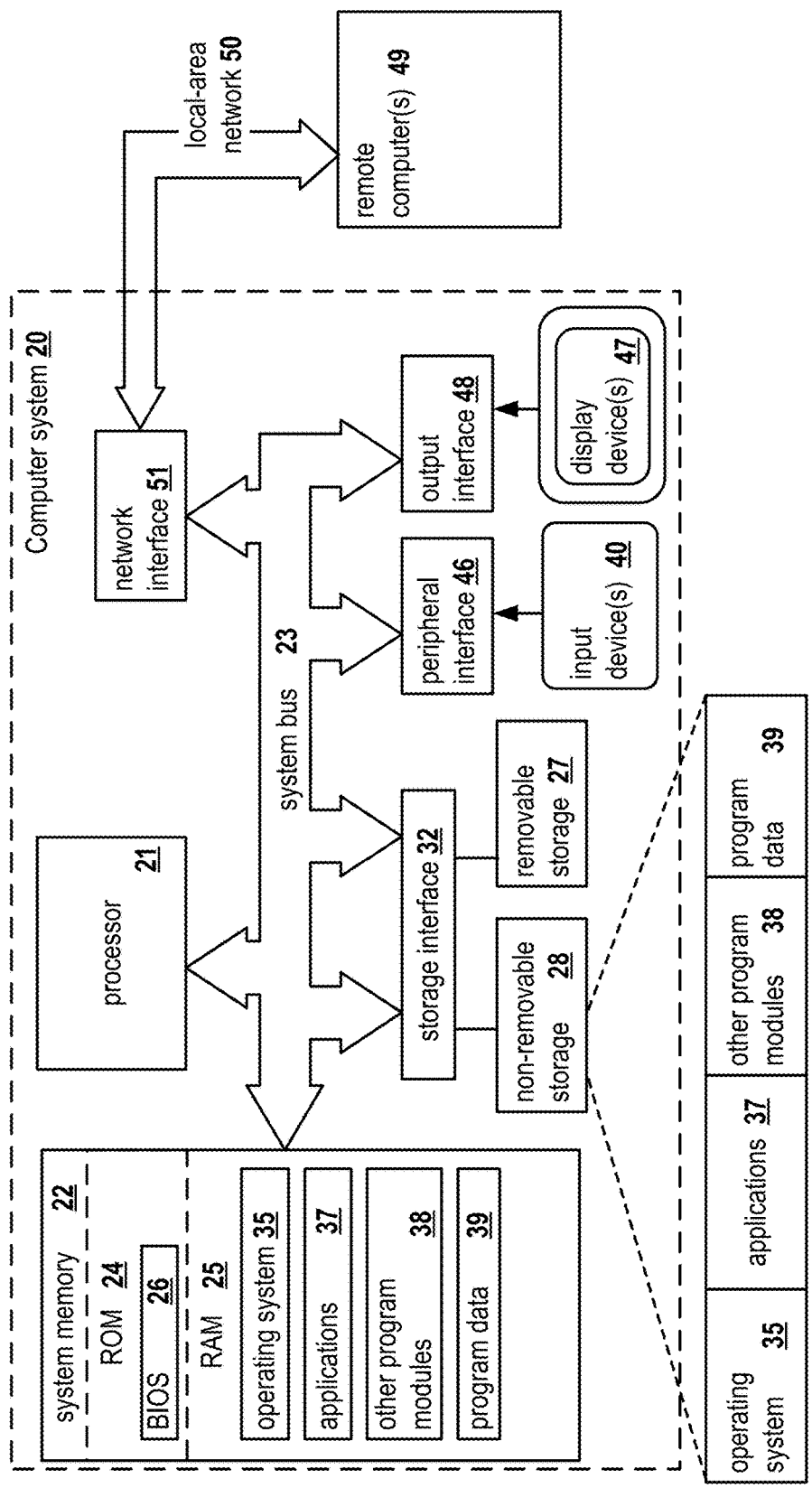
FIG. 12 illustrates an example of a general-purpose computer system, a personal computer or a server, in accordance with exemplary aspects of the present disclosure.

FIG. 12 is a block diagram illustrating a computer system 20 on which aspects of systems and methods for training a model for detecting malicious objects on a computer system may be implemented in accordance with an exemplary aspect. It should be noted that the computer system 20 can correspond to any components of the system 100 described earlier. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable codes implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, pRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computer system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some aspects, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system (such as the one described in greater detail in FIG. 12, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A method for training a model for detecting malicious objects on a computer system, comprising:
    selecting one or more files from a database of files used for training a detection model;
    classifying the one or more files into one or more different classes in a classification of maliciousness;
    forming a plurality of behavior patterns of the one or more files based on execution of the one or more files and parameters of the execution;
    forming a hash function of each behavior pattern, so that an inverse hash function of the result of the formed hash function of each behavior pattern will have a degree of similarity to each respective behavior pattern greater than a specified value;
    training, using machine learning, the detection model based on the hash functions of the behavior patterns of the one or more files, wherein the trained detection model is an aggregate of rules for computing:
        a degree of similarity that indicates a probability that a file belongs to the class into which it was classified, and
        a limit degree of difference that indicates a probability that the file belongs to another class,
        wherein the degree of similarity and the limit degree of difference depend on dynamics of change in a degree of harmfulness of the file as a function of a number of behavior patterns formed during the execution of the file;
    verifying the trained detection model using a test selection of files to test determinations of harmfulness of the test selection of files; and
    when the verification fails, retraining the detection model using a different set of files from the database, otherwise applying the detection model to a new set of files to determine maliciousness.

2. The method of claim 1, wherein the detection model is trained using a method for machine learning from one of: decision tree-based gradient boosting; decision trees; the K-nearest neighbor (kNN) method; and the support vector machine (SVM) method.

3. The method of claim 2, wherein the degree of similarity and the limit degree of difference are calculated based on one or more of: the actions being executed on an object by the computer system, the actions being executed by the object on the computer system, the parameters of the computer system whose change results in a change in a state of the object, and static parameters of the object.

4. The method of claim 1, further comprising:
    retraining the detection model based on an analysis of the calculated degree of harmfulness and a limit degree of safety, wherein the time laws describing the degree of similarity and the limit degree of difference result in correlation between the values obtained on the basis of the time laws tending toward a maximum.

5. The method of claim 1, further comprising:
    retraining the detection model to form a criterion that ensures one or more of: the accuracy of determining the degree of similarity and the limit degree of difference is greater than when using an untrained model for calculation of parameters; and the utilization of the computing resources is lower than when using an untrained model for calculation of parameters.

6. The method of claim 1, further comprising:
    calculating a feature vector of the each behavior pattern, wherein the feature vector of the each behavior pattern comprises a sum of hash sums of elements of the behavior pattern.

7. The method of claim 1, further comprising:
    forming a convolution function, wherein a distance between convolutions obtained, using the convolution function, for each of the behavior patterns having the degree of similarity greater than a predetermined threshold value is less than the predetermined threshold value, and wherein a distance between convolutions obtained, using the convolution function, for each of the behavior patterns having the degree of similarity less than the predetermined threshold value is greater than the predetermined threshold value.

8. A system for training a model for detecting malicious objects on a computer system, the system comprising:
    a hardware processor configured to:
    select one or more files from a database of files used for training a detection model;
    classify the one or more files into one or more different classes in a classification of maliciousness;
    form a plurality of behavior patterns of the one or more files based on execution of the one or more files and parameters of the execution;

form a hash function of each behavior pattern, so that an inverse hash function of the result of the formed hash function of each behavior pattern will have a degree of similarity to each respective behavior pattern greater than a specified value;

train, using machine learning, the detection model based on the hash functions of the behavior patterns of the one or more files, wherein the trained detection model is an aggregate of rules for computing:

a degree of similarity that indicates a probability that a file belongs to the class into which it was classified, and a limit degree of difference that indicates a probability that the file belongs to another class, wherein the degree of similarity and the limit degree of difference depend on dynamics of change in a degree of harmfulness of the file as a function of a number of behavior patterns formed during the execution of the file;

verify the trained detection model using a test selection of files to test determinations of harmfulness of the test selection of files; and when the verification fails, retrain the detection model using a different set of files from the database, otherwise apply the detection model to a new set of files to determine maliciousness.

9. The system of claim 8, wherein the detection model is trained using a method for machine learning from one of: decision tree-based gradient boosting; decision trees; the K-nearest neighbor (kNN) method; and the support vector machine (SVM) method.

10. The system of claim 9, wherein the degree of similarity and the limit degree of difference are calculated based on one or more of: the actions being executed on an object by the computer system, the actions being executed by the object on the computer system, the parameters of the computer system whose change results in a change in a state of the object, and static parameters of the object.

11. The system of claim 8, wherein the hardware processor is further configured to:

retrain the detection model based on an analysis of the calculated degree of harmfulness and a limit degree of safety, wherein the time laws describing the degree of similarity and the limit degree of difference result in correlation between the values obtained on the basis of the time laws tending toward a maximum.

12. The system of claim 8, wherein the hardware processor is further configured to:

retrain the detection model to form a criterion that ensures one or more of: the accuracy of determining the degree of similarity and the limit degree of difference is greater than when using an untrained model for calculation of parameters; and the utilization of the computing resources is lower than when using an untrained model for calculation of parameters.

13. The system of claim 8, wherein the hardware processor is further configured to:

calculate a feature vector of the each behavior pattern, wherein the feature vector of the each behavior pattern comprises a sum of hash sums of elements of the behavior pattern.

14. The system of claim 8, wherein the hardware processor is further configured to:

form a convolution function, wherein a distance between convolutions obtained, using the convolution function, for each of the behavior patterns having the degree of similarity greater than a predetermined threshold value is less than the predetermined threshold value, and wherein a distance between convolutions obtained, using the convolution function, for each of the behavior patterns having the degree of similarity less than the predetermined threshold value is greater than the predetermined threshold value.

15. A non-transitory computer-readable medium storing instructions thereon for detecting malicious objects on a computer system, the instructions comprising:

selecting one or more files from a database of files used for training a detection model;

classifying the one or more files into one or more different classes in a classification of maliciousness;

forming a plurality of behavior patterns of the one or more files based on execution of the one or more files and parameters of the execution;

forming a hash function of each behavior pattern, so that an inverse hash function of the result of the formed hash function of each behavior pattern will have a degree of similarity to each respective behavior pattern greater than a specified value;

training, using machine learning, the detection model based on the hash functions of the behavior patterns of the one or more files, wherein the trained detection model is an aggregate of rules for computing:

a degree of similarity that indicates a probability that a file belongs to the class into which it was classified, and a limit degree of difference that indicates a probability that the file belongs to another class, wherein the degree of similarity and the limit degree of difference depend on dynamics of change in a degree of harmfulness of the file as a function of a number of behavior patterns formed during the execution of the file;

verifying the trained detection model using a test selection of files to test determinations of harmfulness of the test selection of files; and when the verification fails, retraining the detection model using a different set of files from the database, otherwise applying the detection model to a new set of files to determine maliciousness.

16. The medium of claim 15, wherein the detection model is trained using a method for machine learning from one of: decision tree-based gradient boosting; decision trees; the K-nearest neighbor (kNN) method; and the support vector machine (SVM) method.

17. The medium of claim 16, wherein the degree of similarity and the limit degree of difference are calculated based on one or more of: the actions being executed on an object by the computer system, the actions being executed by the object on the computer system, the parameters of the computer system whose change results in a change in a state of the object, and static parameters of the object.

18. The medium of claim 15, wherein the instructions further comprise:

retraining the detection model based on an analysis of the calculated degree of harmfulness and a limit degree of safety, wherein the time laws describing the degree of similarity and the limit degree of difference result in correlation between the values obtained on the basis of the time laws tending toward a maximum.

19. The medium of claim 15, wherein the instructions further comprise:

retraining the detection model to form a criterion that ensures one or more of: the accuracy of determining the degree of similarity and the limit degree of difference is greater than when using an untrained model for calculation of parameters; and the utilization of the computing resources is lower than when using an untrained model for calculation of parameters.

20. The medium of claim 15, wherein the instructions further comprise:
calculating a feature vector of the each behavior pattern, wherein the feature vector of the each behavior pattern comprises a sum of hash sums of elements of the behavior pattern.

* * * * *